US007249169B2

(12) United States Patent
Blouin et al.

(10) Patent No.: US 7,249,169 B2
(45) Date of Patent: Jul. 24, 2007

(54) SYSTEM AND METHOD FOR NETWORK CONTROL AND PROVISIONING

(75) Inventors: Francois J Blouin, Hull (CA); Dinesh Mohan, Ottawa (CA); Maged E Beshai, Stittsville (CA)

(73) Assignee: Nortel Networks Limited (CA)

( * ) Notice: Subject to any disclaimer, the term of this patent is extended or adjusted under 35 U.S.C. 154(b) by 909 days.

(21) Appl. No.: 10/029,148

(22) Filed: Dec. 28, 2001

(65) Prior Publication Data

US 2003/0126246 A1 Jul. 3, 2003

(51) Int. Cl.
*G06F 15/16* (2006.01)

(52) U.S. Cl. ...................................... 709/220; 709/201

(58) Field of Classification Search ................ 709/223, 709/225, 226, 238–244, 200–202, 224; 370/231.01, 370/235, 230, 252, 468

See application file for complete search history.

(56) References Cited

U.S. PATENT DOCUMENTS

| | | | | |
|---|---|---|---|---|
| 6,085,335 | A | 7/2000 | Djoko et al. | |
| 6,243,396 | B1 | 6/2001 | Somers | |
| 6,370,572 | B1 * | 4/2002 | Lindskog et al. | 709/223 |
| 6,556,544 | B1 * | 4/2003 | Lee | 370/256 |
| 6,625,650 | B2 * | 9/2003 | Stelliga | 709/226 |
| 6,654,363 | B1 * | 11/2003 | Li et al. | 370/338 |
| 6,714,572 | B2 * | 3/2004 | Coldren et al. | 372/46 |
| 6,771,651 | B1 * | 8/2004 | Beshai et al. | 370/401 |
| 6,801,502 | B1 * | 10/2004 | Rexford et al. | 370/235 |
| 6,854,013 | B2 * | 2/2005 | Cable et al. | 709/226 |
| 6,888,842 | B1 * | 5/2005 | Kirkby et al. | 370/414 |
| 6,891,810 | B2 * | 5/2005 | Struhsaker et al. | 370/294 |

OTHER PUBLICATIONS

Khalil, I.; Braun, T.; "A range-based SLA and edge driven virtual core provisioning in DiffServ-VPNs" Local Computer Networks, 2001. Proceedings. LCN 2001. 26th Annual IEEE Conference on Nov. 14-16, 2001 pp. 12-21.*

(Continued)

*Primary Examiner*—Moustafa Meky
(74) *Attorney, Agent, or Firm*—McGuinness & Manaras LLP

(57) ABSTRACT

A multi-stratum multi-timescale control for self-governing networks provides automatic adaptation to temporal and spatial traffic changes and to network state changes. Microsecond timescale reacting through the routing function, a facet of the lowest stratum, allows a source node to choose the best available route from a sorted list of routes, and to collect information on the state of these routes. Millisecond timescale correcting through the resource allocation function, a facet of the intermediate stratum, allows the network to correct resource allocations based on requirements calculated by the routing function. Long-term provisioning through the provisioning function at the higher stratum allows the network to recommend resource augmentations, based on requirements reported by the resource allocation function. The control is implemented in the network through coordination across edge node controllers, core node controllers, and network controllers. Metrics based on automated measurements of network performance are used by the control to adjust network resources. The Routing index is collected by the routing function and is the average rank of the selected route within a route-set. The routing function also collects measurements on route Constituent Traffic, which quantifies traffic in each of three categories: (carried) first-class, (carried) secondary, and rejected. The Resource Allocation Index is a metric collected by the resource allocation function. It quantifies the number of failures in re-allocating resources. In another aspect of this invention, a provisioning method is provided, which recommends appropriate link capacity increments based on the aforementioned Constituent Traffic measurements, and based on rules provided by the network operator.

26 Claims, 25 Drawing Sheets

OTHER PUBLICATIONS

Shaikh, A., Rexford, J., and Shin, K. G. 1999. Load-sensitive routing of long-lived IP flows. In Proceedings of the Conference on Applications, Technologies, Architectures, and Protocols For Computer Communication (Cambridge, Massachusetts, United States.*

Assi, C.; Shami, A.; Ali, M.A.; Kurtz, R.; Guo, D., "Optical networking and real-time provisioning: an integrated vision for the next-generation Internet," Network, IEEE , vol. 15, No. 4pp. 36-45, Jul./Aug. 2001.*

Ramamurthy,Ramuetal."CapacityPerformanceofDynamic ProvisioninginOpticalNetworks",IEEEJournalofLightwave Technology,vol. 19,No. 1,Jan. 2001,pp. 40-48.

Sengupta,SudiptaandRamamurthy,Ramu"FromNetworkDesignto DynamicProvisioningandRestorationinOpticalCross-Connect MeshNetworks:AnArchitecturalandAlgorithmicOverview", IEEENetwork,Jul./Aug. 2001,pp. 46-54.

* cited by examiner

400

| Routes | Rank | Availability | Status |
|---|---|---|---|
| AB | 1 | 1 | Primary |
| ACB | 2 | 0 | Secondary |
| ADB | 2 | 1 | Secondary |
| ACDB | 3 | 0 | Secondary |
| ADCB | 3 | 1 | Secondary |

| | Link B-A | Link B-C | Link B-D |
|---|---|---|---|
| Primary Traffic | 9 | 7 | 3 |
| Secondary Traffic | 1 | 3 | 7 |
| Denied Traffic | 4 | 3 | 3 |

Edge Node A

| Sink | Route-set | Rank | Status |
|---|---|---|---|
| B | AB} | 1 | Primary |
| | ACB | 2 | Secondary |
| | ADB | 3 | Secondary |
| C | AC | 1 | Primary |
| | ADC | 2 | Secondary |
| D | AD | 1 | Primary |
| | ACD | 2 | Secondary |
| | ABD | 2 | Secondary |

Edge Node A

| Link | Free |
|---|---|
| A-B | 0.05 |
| A-C | 0.1 |
| A-D | 0.5 |

Edge Node B

| Link | Free |
|---|---|
| B-A | 0.2 |
| B-C | 0.05 |
| B-D | 0.6 |

Edge Node C

| Link | Free |
|---|---|
| C-A | 0.2 |
| C-B | 0.3 |
| C-D | 0.1 |

Edge Node D

| Link | Free |
|---|---|
| D-A | 0.1 |
| D-B | 0.4 |
| D-C | 0.05 |

Edge Node A

| Sink | #Requests | Σ Di • Ci | Σ Ci | Routing Index |
|---|---|---|---|---|
| B | 17 | 0.46 | 0.25 | 1.84 |
| C | 20 | 0.3 | 0.2 | 1.5 |
| D | 25 | 0.24 | 0.22 | 1.09 |

2002A

Edge Node A

| | Link A-B | Link A-C | Link A-D |
|---|---|---|---|
| **Primary** | 8.9 | 7.6 | 4.5 |
| **Secondary** | 1.1 | 0.8 | 0.3 |
| **Denied** | 1.7 | 0.3 | 0.1 |

2002B

Edge Node B

| | Link B-A | Link B-C | Link B-D |
|---|---|---|---|
| **Primary** | 7.0 | 8.5 | 2.9 |
| **Secondary** | 0.4 | 4.7 | 0.7 |
| **Denied** | 0.1 | 0.5 | 0.02 |

2002C

Edge Node C

| | Link C-A | Link C-B | Link C-D |
|---|---|---|---|
| **Primary** | 6.7 | 9.2 | 3.6 |
| **Secondary** | 1.1 | 2.9 | 0.1 |
| **Denied** | 0.2 | 1.2 | 0.01 |

2002D

Edge Node D

| | Link D-A | Link D-B | Link D-C |
|---|---|---|---|
| **Primary** | 4.3 | 3.1 | 4.0 |
| **Secondary** | 1.4 | 0.7 | 1.2 |
| **Denied** | 0.01 | 0.1 | 0.03 |

Edge Node A

| Sink | #Requests | Σ Di • Ci | Σ Ci | Routing Index |
|---|---|---|---|---|
| **B** | **18** | **0.66** | **0.35** | **1.89** |
| **C** | **20** | **0.3** | **0.2** | **1.5** |
| **D** | **25** | **0.24** | **0.22** | **1.09** |

2102A

Edge Node A

| | Link A-B | Link A-C | Link A-D |
|---|---|---|---|
| **Primary** | **8.9** | **7.6** | **4.5** |
| **Secondary** | **1.1** | **0.9** | **0.3** |
| **Denied** | **1.8** | **0.3** | **0.1** |

2102C

Edge Node C

| | Link C-A | Link C-B | Link C-D |
|---|---|---|---|
| **Primary** | **6.7** | **9.2** | **3.6** |
| **Secondary** | **1.1** | **3** | **0.1** |
| **Denied** | **0.2** | **1.2** | **0.01** |

| | Link A-X | | Link B-X | | Link X-Y | Link X-Z |
|---|---|---|---|---|---|---|
| | **A to X** | **X to A** | **B to X** | **X to B** | **X to Y** | **X to Z** |
| **Primary** | **21.0** | **18** | **18.4** | **21.2** | **16.1** | **7.4** |
| **Secondary** | **2.3** | **2.9** | **5.8** | **4.8** | **5.6** | **1** |
| **Denied** | **2.2** | **0.31** | **0.62** | **3.1** | **0.8** | **0.11** |

2302Y

| | Link C-Y | | Link X-Y | Link Y-Z |
|---|---|---|---|---|
| | **C to Y** | **Y to C** | **Y to X** | **Y to Z** |
| **Primary** | **19.5** | **20.1** | **6.7** | **3.6** |
| **Secondary** | **4.2** | **6.8** | **1.1** | **0.1** |
| **Denied** | **1.41** | **0.83** | **0.2** | **0.01** |

2302Z

| | Link D-Z | | Link X-Z | Link Y-Z |
|---|---|---|---|---|
| | **D to Z** | **Z to D** | **Z to X** | **Z to Y** |
| **Primary** | **11.4** | **11** | **7.4** | **4** |
| **Secondary** | **3.3** | **1.1** | **2.1** | **1.2** |
| **Denied** | **0.14** | **0.13** | **0.11** | **0.03** |

*FIG. 23*

Network controller

| Overloaded link | Denied traffic |
| --- | --- |
| **Link B-X** | **3.1** |
| **Link A-X** | **2.2** |
| **Link C-Y** | **1.41** |

SYSTEM AND METHOD FOR NETWORK CONTROL AND PROVISIONING

FIELD OF THE INVENTION

The present invention relates generally to the area of communication networks, and more specifically to the areas of provisioning, resource allocation, routing, network control and network self-governance.

BACKGROUND OF THE INVENTION

Network provisioning processes enable a network to determine the location and size of different network resources available for long-term deployment, typically in the order of several months or years. Such provisioning exercises are typically based solely on projected traffic demands within a network and the agreed traffic exchanges across other networks.

Traditionally, network provisioning has been based on underlying traffic-characterization models, traffic-flow models and performance models. The traditional provisioning process worked well in the telephone network where traffic loads were predictable. The traffic could be characterized with a reasonable accuracy, and the respective performance models that relate the performance to the traffic loads and the network resources were both accurate and tractable.

However, none of these conditions applies to fast-evolving data networks. Accurate traffic characterization at both the microscopic and macroscopic levels is not feasible in the rapidly evolving data networks. Microscopic characterization refers to a parametric description of each traffic stream, whereas macroscopic characterization is concerned with the spatial distribution of traffic. Microscopic-level characterization is difficult due to the rapidly changing nature of the traffic; macroscopic-level characterization is difficult due to changing network services.

Elaborate traffic characterization models and their ensuing provisioning models, even if believed to be accurate, maybe applicable over only relatively short timescales. It would take researchers years to develop and refine such models only to discover, before the exercise is complete, that the models are obsolete. A good example is the development of the tedious Markov Modulated Poisson Process, which is based on assumptions that have since been deemed to be inadequate. Another extreme is the self-similar-traffic model, which would yield an unduly pessimistic estimation of the network performance. In addition to the inadequacy of these models, the traffic parameters required to implement the mathematical models are difficult to determine. Data traffic is a rapidly moving target and its composition changes with technology. Higher access capacity, new applications, new protocols, etc., have a significant effect on the traffic characteristics at both the microscopic and macroscopic levels.

The use of precise microscopic models, even if they were attainable and tractable, cannot be justified, given the rapid change of the traffic nature. Instead, a simplified traffic model may possibly be used as long as the values of the characterizing parameters are updated frequently. A simplified traffic model also leads to a simplified microscopic provisioning model that facilitates the computation of traffic-flow across the network. The use of frequently updated simplified models, however, requires traffic monitoring, at least at each source node, and frequent execution of provisioning models. The network performance, however defined, must still be measured in order to validate the provisioning model. Furthermore, considering the unavailability of a satisfactory traffic model, it is difficult to determine what to measure and how to extract parameters from the measurements. Moreover, this solution would require the use of both traffic models and traffic monitoring, which would require excessive computing time, after which relevant, current data on which to base provisioning decisions may not be easily obtained.

Another issue to be considered is that most network configurations today are carried out statically through manual provisioning intervention. Core nodes provided in such networks are cross-connectors, optical and/or electronic, which are configured on a semi-permanent basis. Some proposals like the ITU-T's Automatically Switched Transport Network (ASTN) introduce dynamic configurations, but still require the configuration requirements to be determined through manual intervention. Therefore there is still a need to automatically predict such configuration requirements through learning based on measurements in the network.

SUMMARY OF THE INVENTION

The present invention advantageously provides a multi-stratum multi-timescale control system and method for a network of nodes connected with links, where the method enables the network to autonomously adapt to time-varying traffic and network-state. The steps in the method are based on multi-timescale measurements in the network to offer real-time resource allocation and provide long-term provisioning requirements. Network functions for each stratum rely upon the effective operation of network functions of lower strata, with each stratum operating at a different timescale. The network is enabled to autonomously adapt to time-varying traffic and network-state by receiving real-time resource allocation and long-term provisioning requirements according to the present invention.

In contrast with known systems and methods, this invention describes a control in which the network functions of each stratum collaborate to achieve self-governance. A function from a lower stratum, if any, collects performance metrics, which are used to calculate resource requirements sent to an upper stratum. A routing index and a resource allocation index are advantageously provided by the present invention. The routing index may be based on measurements relating to route depth, constituent traffic, or traffic classification with respect to defined thresholds. A provisioning method described as another aspect of this invention calculates capacity requirements based on constituent traffic, and avoids the duplicate counting of traffic demands.

According to an aspect of the invention, there is provided a multi-stratum multi-timescale control system for a network, said system comprising: routing means operating at a first stratum on a first timescale for providing routing functions; resource allocation means operating at a second stratum on a second timescale for providing resource allocation functions; provisioning means operating at a third stratum on a third timescale for providing provisioning functions; each successive timescale being coarser than the previous timescale; and wherein a lower stratum network function provides network information to a higher stratum network function, said higher stratum network function making control decisions based on said network information, thereby providing a high degree of automated network control operation.

According to another aspect of the present invention, there is provided a multi-timescale control method for a network wherein each successive timescale in said network is coarser than its preceding timescale, said method comprising the steps of: performing, on a first timescale, a routing function, said routing function including determining resource allocation requirements based on a routing index; configuring, on a second timescale, network resources to satisfy said resource allocation requirements, said step of configuring including determining resource augmentation requirements based on a resource allocation index; calculating, on a third timescale, network provisioning requirements based on said resource augmentation requirements, whereby said network provisioning requirements may be provided for a resource augmentation decision.

According to a further aspect of the present invention, there is provided a network provisioning system comprising: routing means operating at a first stratum on a first timescale for providing routing functions; resource allocation means operating at a second stratum on a second timescale for providing resource allocation functions; provisioning means operating at a third stratum on a third timescale for providing provisioning functions; each successive timescale being coarser than its preceding timescale; and wherein a lower stratum network function provides constituent traffic information to a higher stratum network function, said higher stratum network function making control decisions based on said constituent traffic information, thereby providing a high degree of automated network provisioning.

According to a yet further aspect of the present invention, there is provided a provisioning method for a multi-timescale, multi-stratum network, wherein each successive timescale in said network is coarser than its preceding timescale and wherein each stratum operates on a different timescale, said method comprising the steps of: providing constituent traffic information from a first means operating at a first stratum to a second means operating at a second stratum; and calculating, at said second means, network provisioning requirements based on said constituent traffic information, whereby said network provisioning requirements may be provided for a resource augmentation decision and whereby said calculations do not depend on traffic predictions nor on traffic engineering models.

The present invention advantageously provides a method of measuring efficacy of route selection for a multi-timescale multi-stratum network wherein each successive timescale in said network is coarser than its preceding timescale, said method comprising the steps of: measuring at least one parameter relating to a plurality of routes in a route set; and compiling a routing index metric based on said measured parameters; and measuring efficacy of route selection in said network on the basis of said routing index metric.

The present invention further advantageously provides a method of measuring efficacy of resource allocation in a multi-timescale, multi-stratum network, wherein each successive timescale in said network is coarser than its preceding timescale and wherein each stratum operates on a different timescale, said method comprising the steps of: measuring constituent traffic information based on the classification and amount of traffic accepted and rejected on various links of the network system; providing said constituent traffic information from a first means operating at a first stratum to a second means operating at a second stratum; compiling a resource allocation index metric on the basis of said constituent traffic information; and measuring the efficacy of resource allocation in said network on the basis of said resource allocation index metric.

The present invention still further advantageously provides a method of establishing a connection within a network, said network comprising a plurality of nodes including a source node and a sink node, said plurality of nodes each having a controller, the method including the steps of: sending a request for connection from said source node to said sink node; selecting an end-to-end route from a route set; sending a connection request to nodes comprised in the said end-to-end route, sending a request for measurements to be taken along the entire end-to-end route; and collecting said measurements locally at said nodes comprised in the end-to-end route.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Embodiments of the present invention will be further described with reference to the accompanying drawings, in which:

FIG. 4 illustrates an example route-set on edge node 210A for sink edge node 210B of the network shown in FIG. 3;

FIG. 7 illustrates a constituent traffic table (also called link-usage record) in accordance with another aspect of the present invention;

FIG. 20 illustrates constituent traffic tables for the network of FIG. 18;

FIG. 21 illustrates an updated routing index table and updated constituent traffic tables for the network of FIG. 18;

FIG. 23 illustrates constituent traffic information for the network of FIG. 16;

DETAILED DESCRIPTION OF THE INVENTION

Multi-Stratum Multi-Timescale Network

Figure 1:
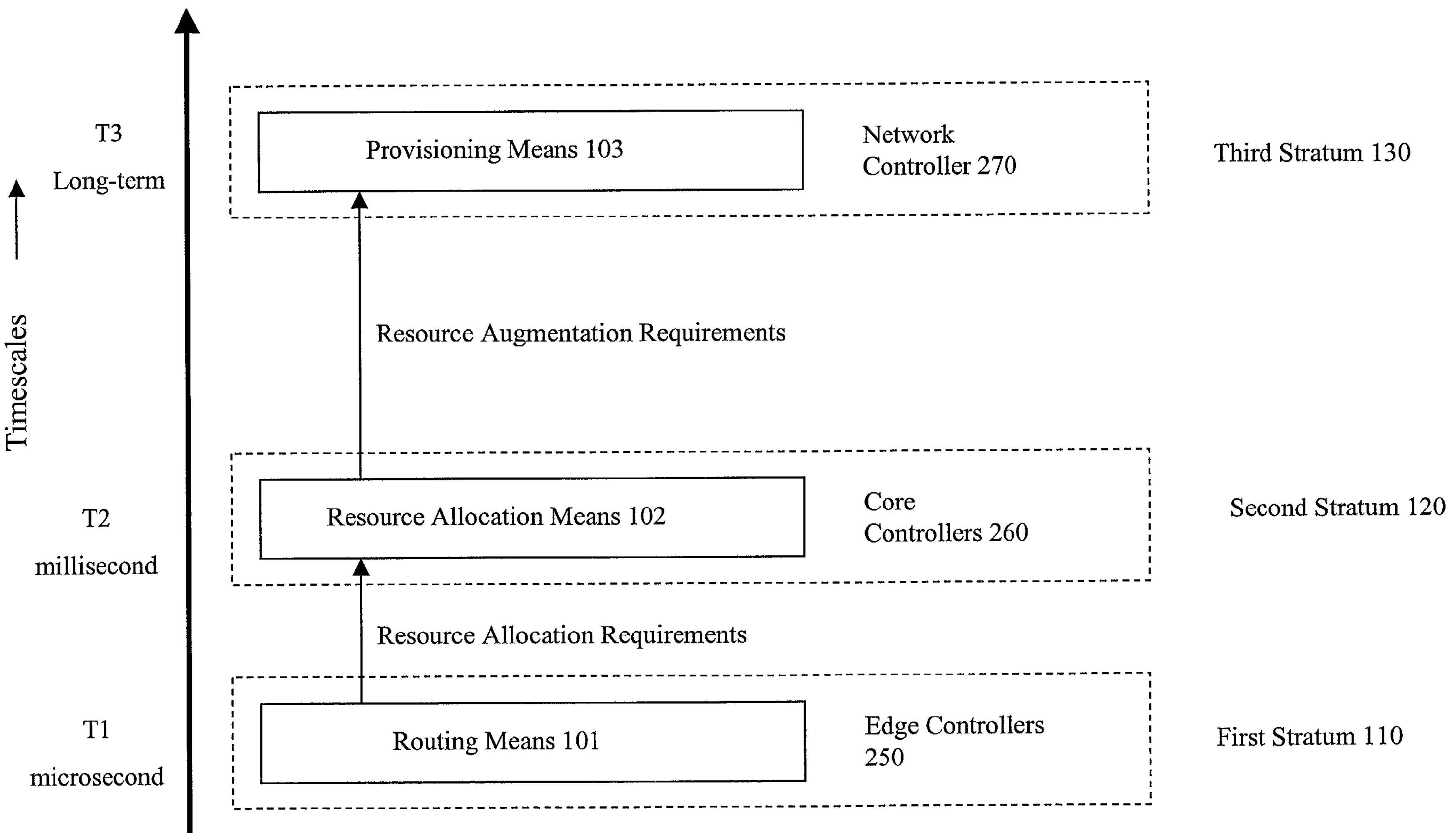
FIG. 1 illustrates a functional representation of a multi-stratum multi-timescale network control according to an embodiment of the present invention.

FIG. 1 illustrates a functional representation of a multi-stratum multi-timescale network according to an embodiment of the present invention. The example in FIG. 1 comprises three strata and three timescales, each timescale being associated with a stratum.

Routing means 101 operates at a first stratum 110 on a first timescale T1. Although the first timescale T1 is shown as being in the order of microseconds, other timescales or ranges of times may alternatively be used. The only requirement with respect to the timescales according to an embodiment of the present invention is that each successive timescale in said network be coarser than the previous timescale. A second timescale is said to be coarser than a first timescale if the mean time interval between consecutive actions associated with said second time scale is appreciably higher than the mean time interval between consecutive actions associated with said first timescale, said actions including observations, measurements, exchange of messages, execution of processes, computing, etc. Network information in the form of resource allocation requirements may be sent as a trigger to resource allocation means 102 operating at a second stratum 120 on a second timescale T2, where T2 is in the order of milliseconds in this particular example. A different set of network information in the form of resource augmentation requirements may be sent as a trigger to provisioning means 103 operating at third stratum 130 on a third timescale T3, where T3 is a long-term timescale in this example, typically in the order of weeks or months.

In this manner, network functions being performed at the various means located at each stratum collaborate to achieve network self-governance. Functions from a lower stratum collect network information, which is used to calculate requirements that are sent to an upper stratum. A discussion of an exemplary network in association with which the present invention will be described, is followed by detailed specifics of the information collection and calculation involved.

In this detailed description, a network with three strata will be described so as to demonstrate the interactions therebetween. However, in an alternate embodiment, the first stratum 110 and the second stratum 120 may be integrated. In a further alternate embodiment, the routing means 101 and the resource allocation means 102 may be integrated. These two alternate embodiments may be provided independently of one another. Of course, further alternate embodiments comprising a network with more than three strata may also be provided following the concepts presented herein, with the necessary adjustments being obvious to one skilled in the art.

Network Components and Connections

Figure 2:
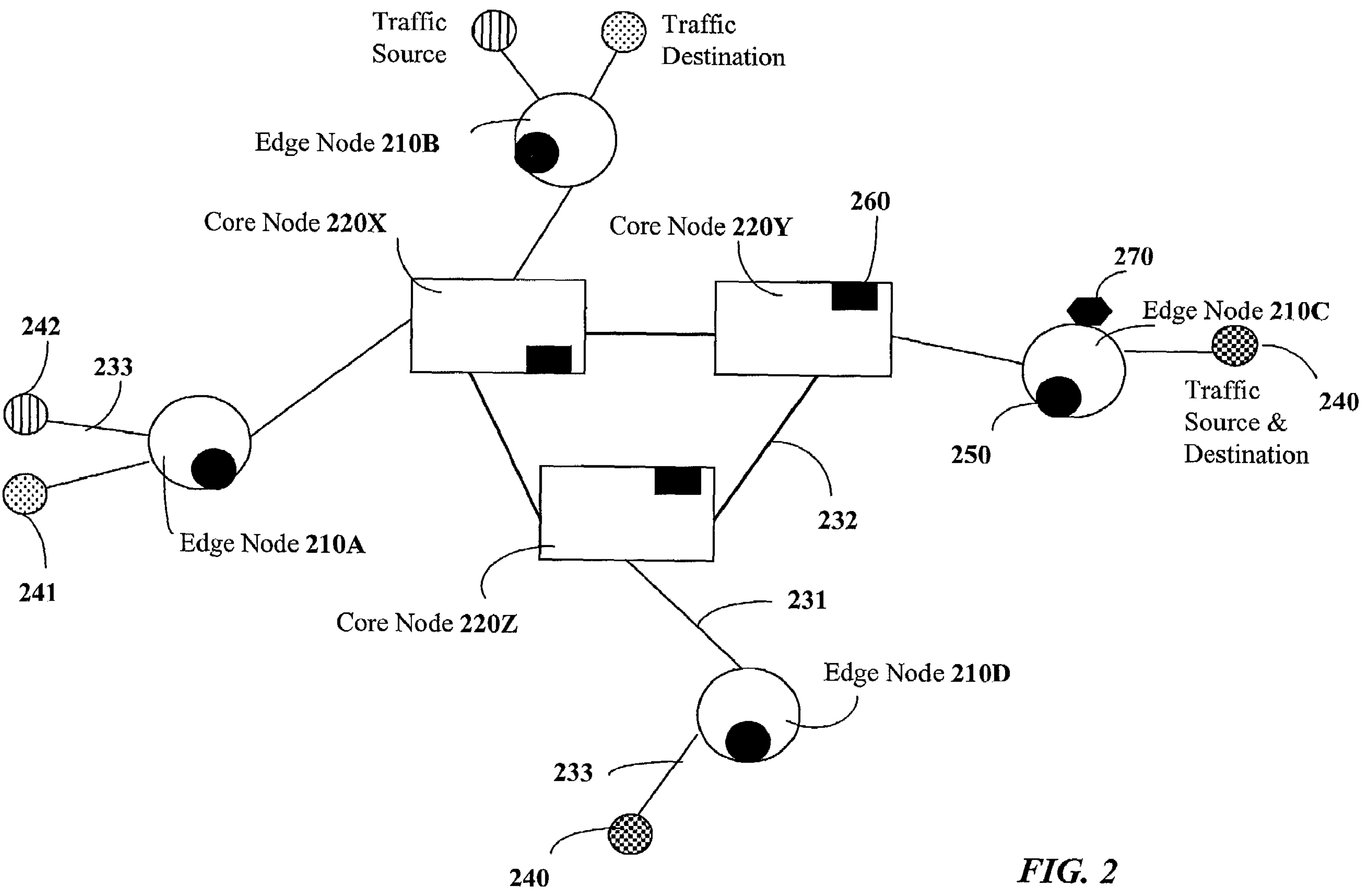
FIG. 2 illustrates a block diagram of a network used for describing embodiments of the present invention.

FIG. 2 shows a network used for describing the preferred embodiments of the present invention. The network comprises interconnected edge nodes 210 and core nodes 220.

An edge node 210 may be an electronic packet switch or router with optical interfaces. The edge nodes 210 are connected to traffic sources 241 and traffic sinks 242 by access-links 233. It is also possible to have a traffic source and a traffic sink folded on the same node, as shown by traffic device 240. The total traffic demand from all traffic sources 241 connected to a specific edge node, e.g., edge node 210A, to all traffic sinks 242 connected to another specific edge node, e.g., edge node 210B, is considered as aggregated traffic demand from edge node 210A to edge node 210B.

A core node 220 may be a high-capacity switch. It can be electronic, or optical, such as an Optical Cross-Connector (OXC). It can switch channels (wavelengths), channel-bands, Time Division Multiplexing (TDM) frames, bursts, or a combination of these. A core node 220 may have wavelength conversion capabilities.

According to an embodiment of the present invention, every edge node 210 includes an edge controller 250 and every core node 220 includes a core controller 260. The network also includes a network controller 270. In the arrangement shown in FIG. 2, the network controller 270 is supported by edge node 210C. In an alternate embodiment, it is possible to co-locate the network controller 270 with a core node 220 or a different workstation in the network. Such a network allows edge controllers 250 to exchange control information with other edge controllers 250, core controllers 260 and network controller 270. This exchange of control information may occur over in-band paths or out-of-band paths. In-band paths are embedded within edge-core links 231, whereas out-of-band paths are implemented using other dedicated links (not shown in FIG. 2).

In a preferred embodiment of the present invention, the routing means 101 includes at least one edge controller 250, the resource allocation means 102 includes at least one core controller 260, and the provisioning means 103 includes the network controller 270. The resource allocation means 102 may alternatively comprise at least one core controller 260 as well as the network controller 270.

The routing means 101 preferably performs route selection functions and route analysis functions. The resource allocation means 102 preferably performs resource allocation functions and resource allocation analysis functions. The provisioning means 103 preferably performs network provisioning process functions.

Nodes in the network are interconnected with physical links. An edge-core physical link 231 connects an edge node to a core node. A core-core physical link 232 connects a core node to another core node. Each physical link may comprise a number of fiber links. A number of wavelengths may be carried by each fiber link, using a Wavelength Division Multiplexing (WDM) technique, where each wavelength corresponds to a channel. A channel-band is a set of channels manipulated as a single carrier and carried by the same fiber link. A light-path is a succession of consecutive channels or consecutive channel-bands forming an optical connection through the optical core from a source edge node to a sink edge node. A light-path has the wavelength continuity property if and only if none of its wavelengths is converted. A wavelength is modulated at a specific bit rate, which determines the bit rate or the capacity of the associated channel. It is assumed that the bit rate of a channel is fixed, and that it is the same for all channels in the same fiber link. The capacity of a channel may be further divided into time slots of equal duration, using a Time Division Multiplexing (TDM) technique. Each of these different links and portions of capacity thereof described above will be collectively referred to hereinafter as resources.

Provisioning and Resource Allocation Considerations

In order to provide a desired grade of service, sufficient resource capacity must be provided and allocated in the network. Core nodes 220 provide connectivity between edge nodes 210 by allocating resources over edge-core links 231 and core-core links 232, to provide edge-to-edge links of adaptive capacity.

The network is initially provisioned based on the estimated aggregate traffic demand for each pair of edge nodes 210. This determines the initial size and location of the nodes and the links in the network. Temporal and spatial changes in traffic and time-varying network state require adaptations within the network. Some resources, such as the physical links, are installed according to provisioning requirements. Other resources, such as light-paths, channel-bands, channels, and TDM time slots, may be re-allocated automatically by the network. The determination of which resources may be re-allocated automatically depends on the presence of appropriate control protocols and switching devices in the network. Channels, for example, are provisioned manually by operators in some existing networks, and are reallocated automatically in some other known networks.

In addition to the resources already defined above, the resources described below also exist for capacity reservation over multiple edge nodes, within the existing adaptive edge-to-edge links. A path is a quantity of capacity reserved on the source edge node, the sink edge node, and the intermediate core nodes or edge nodes of a specific route. A connection is a quantity of capacity reserved on a specific route from a user connected to a source edge node to another user connected to a sink edge node. A connection may be set up within an existing path, in which case it does not require signaling to the intermediate core nodes or edge nodes to reserve resources. A connection that is set up outside a path requires signaling to the intermediate edge nodes to reserve resources, and may be referred to as an independent connection.

From the above discussions of different resources, it is apparent that there can be several levels of resources in a network. A physical link may carry several adaptive edge-to-edge links, each of which may carry several paths, each of which paths may carry several connections. There can be, therefore, multiple levels of resource allocation. The number of optical channels, optical channel-bands, and TDM slots composing an adaptive edge-to-edge link can be modified to adjust the capacity between two edge nodes. The capacity of a path or of a connection can also be modified. For simplicity, the resource allocation function is described in reference to the allocation of optical channels to adjust the capacity of adaptive edge-to-edge links. Extensions of the present description to multi-level resource allocation, and to the allocation of channel-bands, TDM time slots, path capacity, and connection capacity, will be apparent to those skilled in the art.

Routing Considerations

Data transporters such as packets, connections, paths, and light-paths, need to be routed through the network. That is, a node receiving such a data transporter must select the node and the link to which the transporter will be forwarded in order to progress towards the transporter's destination. The sequence of links followed by the data transporter from the source node to the sink node forms a route. The route can be completely specified by the source node, or it can be decided hop-by-hop by the intermediate nodes. For clarity and simplification of presentation herein, it is assumed that routes are completely specified by the source node. However, extensions of the present description to hop-by-hop route specification, and routing of different types of data transporters, will be apparent to those skilled in the art.

When routing data transporters, the routing function triggers a signaling function, the purpose of which is to reserve resources on the nodes and links along the selected route for the data transporter. The signaling function is also triggered when the capacity of an existing data transporter needs to be modified.

The set-up of a connection within a path is simplified by the fact that resources have already been reserved on the intermediate nodes. Signaling is required only to the sink edge node of the connection.

The routing of a connection-oriented packet is simplified by the presence of a field in the packet header indicating the connection to which that the packet belongs. A connection-oriented packet simply follows the route specified for the connection to which it belongs.

For simplicity, the routing function and the signaling function in the present description will be described in reference to independent connections only. For further brevity, an independent connection will be referred to hereinafter simply as a connection.

Figure 3:
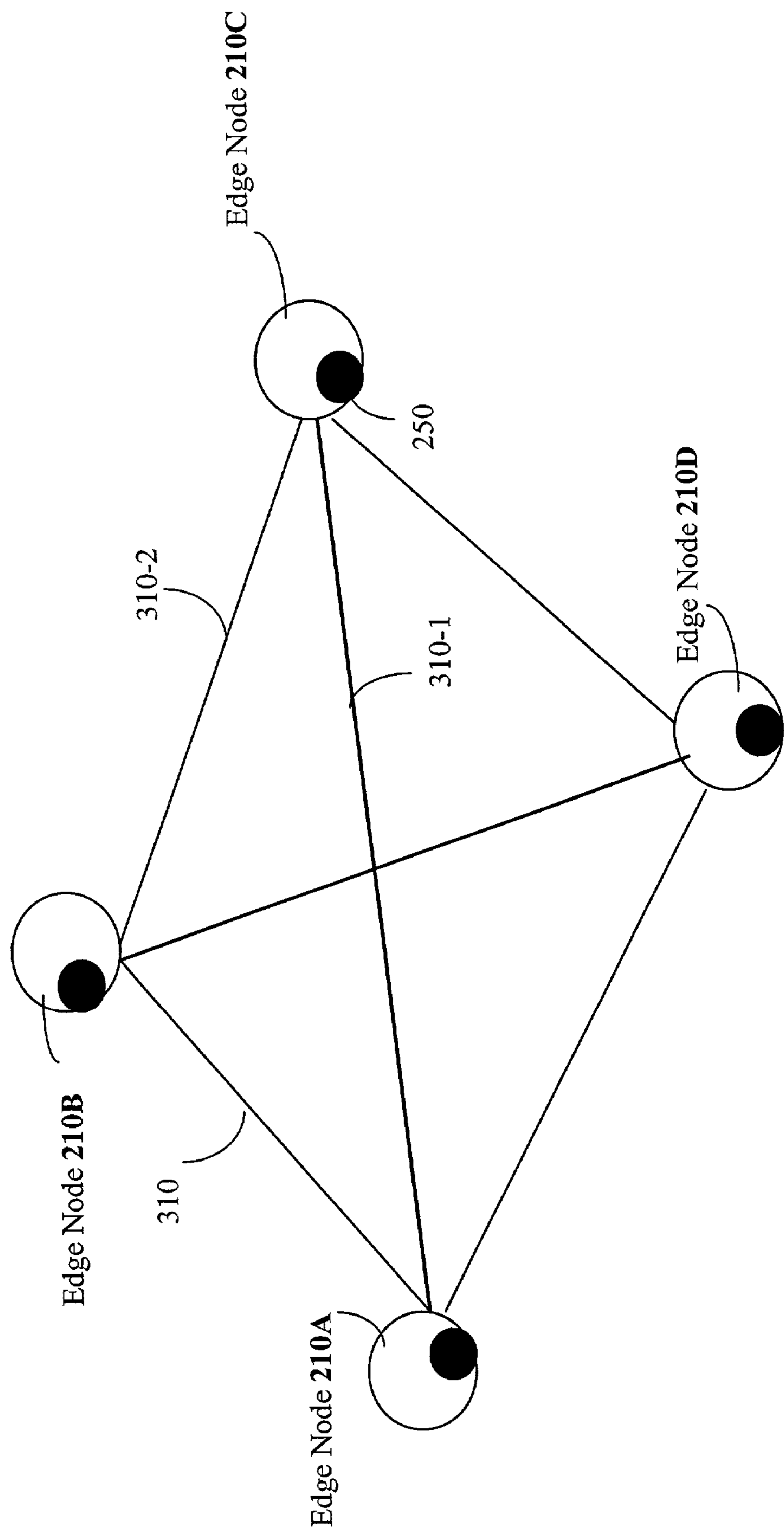
FIG. 3 illustrates another view of the network of FIG. 2, with edge nodes thereof shown as being connected to other edge nodes through adaptive edge-to-edge links.

FIG. 3 illustrates another view of the network of FIG. 2, but with edge nodes 210 shown as being connected to other edge nodes through adaptive edge-to-edge links 310. The capacity of edge-to-edge links 310 results from the allocation of channels requested by edge nodes and performed by the resource allocation function in the core nodes. For example, an edge-to-edge link 310-1 between edge node 210A and edge node 210C is provided by resource allocations through core node 220X and core node 220Y, shown earlier in FIG. 2. FIG. 3 shows only one edge-to-edge link for each edge-node pair. It is clear, however, that there can be more than one edge-to-edge link between two edge nodes, each distinct edge-to-edge link being realized through a different sequence of the core nodes. For example, there can be a second edge-to-edge link between edge node 210A and edge node 210C through core node 220X, core node 220Z and core node 220Y.

For simplicity, in a network with only one edge-to-edge link per edge-node-pair such as the one depicted in FIG. 3, a route followed by a data container may be specified unambiguously by the sequence of the traversed edge nodes. For example, the route A-X-B-X-Y-C may be written as route ABC.

Route-Sets

In an embodiment of the present invention, the edge controller 250 of every edge node 210 in a network maintains pre-calculated route-sets, where each route-set is associated with a particular sink edge node. Route-sets are pre-calculated at the time of network initialization and following each new network provisioning. Network initialization occurs during the initial deployment of the network, whereas network provisioning occurs whenever network resources are added or deleted. Route-set calculations typically consider network topology, routing rules, and ranking criterion. Routing rules describe the characteristics of different routes, some route characteristics being cost, diversity, propagation delay, protection etc. The number of routes within a route-set can be based on network characteristics, such as overall traffic demands in the network, and provided rules. A ranking criterion is used to rank routes in a route-set as described in the next section.

Each route-set consists of a plurality of routes from a source edge node to a sink edge node. Each route of said plurality is an ordered list of edge-to-edge links over which connections are established and differs from other routes in the route-set by at least one route metric, where the route metrics include cost, distance, diversity, reliability, intermediate edge node hops and protection. For simplicity in this presentation, it is assumed that a route can be noted unambiguously by the ordered list of nodes traversed by the route. With reference to the network representation as shown in FIG. 3, a route going from source node 210A, to intermediate node 210C, and to sink node 210B is noted route ACB.

FIG. 4 illustrates an example route-set for sink edge node 210B on edge node 210A of the network shown in FIG. 3. Route set 400 is composed of a list of routes 410, as well as rank 420, availability 430, and status 440 associated with each of the routes in the list of routes 410. The routes within a route-set are ordered according to a rank that is assigned relative to other routes in the route-set. The rank assignment is based on a pre-determined criterion. In a preferred embodiment, the pre-determined rank assignment criterion, noted C, is a linear combination of the route propagation delay and the number of intermediate hops along the route, $C=\alpha P+H$, where P is the propagation delay, H is number of hops and $\alpha$ is a tunable parameter. Each of the ranks illustrated in FIG. 4 is based on the number of hops only (i.e., $\alpha=0$).

A route with the least value of the rank assignment criterion C is considered the most desirable and is assigned the topmost rank. Therefore, top-ranked routes appear at the beginning of the ordered route-set while low-ranked routes appear deeper in a route-set. Routes with a value of C within a same range may be given the same rank; routes with the same rank may be described as belonging to a route-band of that rank within a route-set. Two policies may direct the selection of a route within a route-band. In one policy, the route selection is based on cyclically considering the routes within a band, thereby spreading the traffic load among these routes. In another policy, routes are ordered within a band, and the route-selection process examines routes in the specified order from first route to last route for each connection request, thereby packing the traffic load on the first routes within the band.

The depth of the route selected from a route-set for any traffic connection can be used as a measure of success in selecting the best route from that route-set. Therefore, a route of a better rank, being higher up in the route-set, will have a lower depth, indicating the selection of a better route.

The edge controllers strictly adhere to the calculated route-set until it is recomputed as a result of provisioning. Based on network state, which is observed in real-time, a route in a route-set is marked as unavailable until the cause of unavailability is corrected. Referring once again to FIG. 4, an example route-set on an edge node 210A of FIG. 3 used for routing connections to a sink edge node 210B is presented. The rank assignment criterion C chosen for this example is C=H, where H is the number of hops in the route, such that the route with the least number of hops is assigned highest rank. As can be seen in FIG. 4, routes ACB and ADB have the same rank and belong to a route-band with rank 2. Routes ACDB and ADCB belong to another route band with rank 3. Also shown is the states of route ACB and ACDB that are marked unavailable. Since the common link for those two routes is edge-to-edge link 310-1, it is possible that the state of both routes be changed to available when the edge-to-edge link 310-1 in FIG. 3 is restored. It is noted that each of the links illustrated in FIG. 3 may comprise two directional links of opposite directions. In general, the capacities of said two directional links need not be equal, and one of them may not even be provided.

A route status 440 may be used to classify the connections established between edge nodes, for the purpose of measuring constituent traffic. The status 440 of a route is either primary or secondary. In this preferred embodiment, the first route in the route set is given primary status, while other routes are given secondary status. The invention can be extended to allow a number of routes to be given primary status, provided that the extended method avoids duplicate accounting for rejected traffic on a plurality of routes. A method allowing a number of routes to be given primary status can also be extended to allow the status of a route to be changed dynamically during the operation of the network. For example, the status of a secondary route can be upgraded to primary, if the denied traffic on all primary routes reaches a given threshold, indicating that the volume of traffic necessitates an extra route.

Route Selection and Connection Signaling

Route-selection comprises selecting a route to carry a connection. Route-selection must be fast enough to ensure rapid delivery of traffic and to avoid loss of traffic as each edge node 210 has limited buffering capabilities. For this reason, the network is required to react immediately upon receiving a request for connection with network functions being performed in a short period. There is no time for the edge controllers to forward requirements to core controllers to modify existing edge-to-edge links of a single route to accommodate a received request for connection since such modifications occur on a coarser, e.g., millisecond, timescale.

The route-selection is performed in accordance with a route-ranking method wherein routes within a given route-set are ranked based on some pre-determined criterion, as described earlier. As part of route-selection, an edge controller 250 signals the connection over available top-ranked routes first. The signaling forwards connection requirements to every intermediate edge node along the selected route. Depending upon state, each intermediate edge node determines if it can accommodate the connection requirements.

Figure 5:
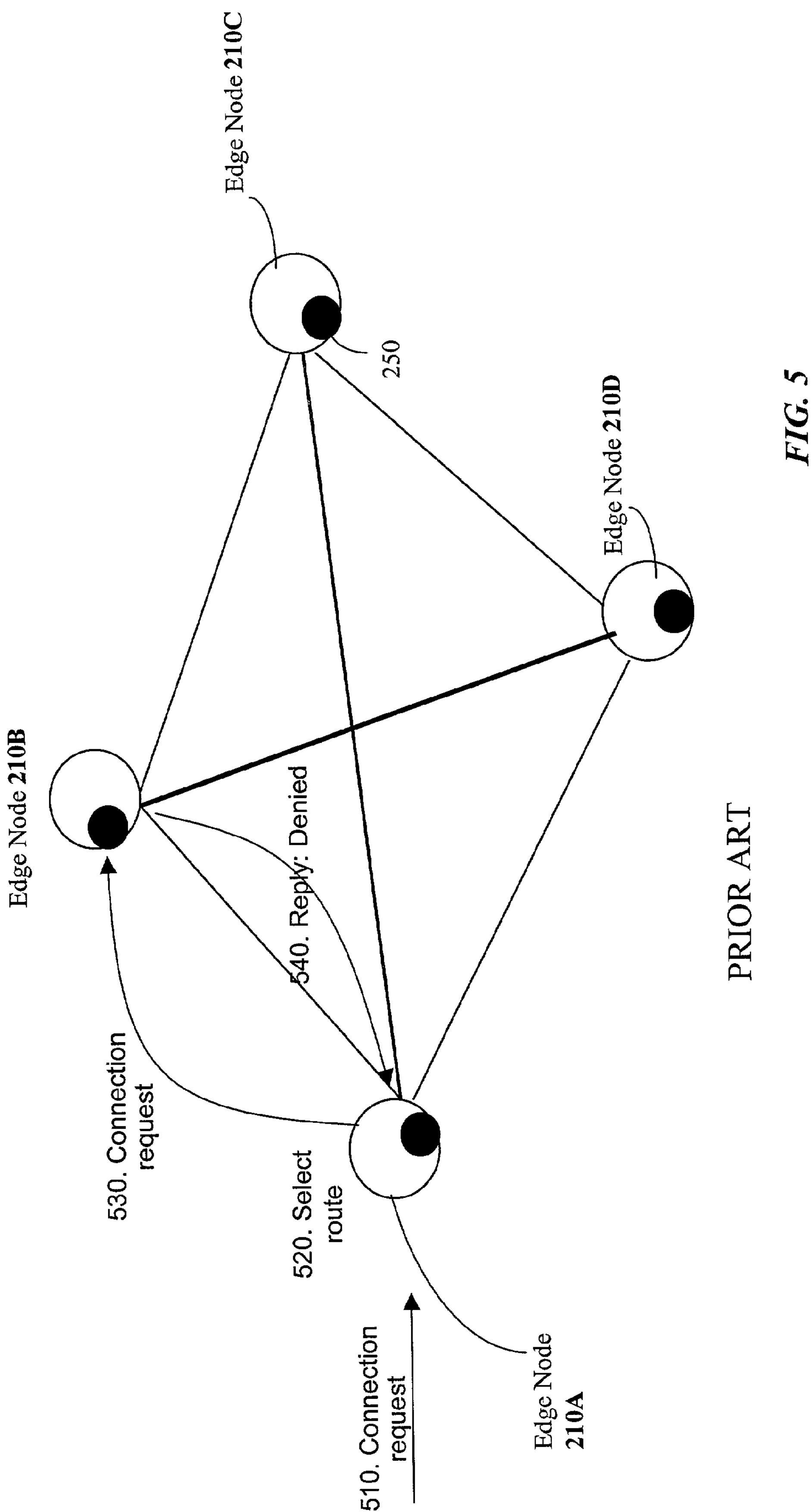
FIG. 5 illustrates a prior art signaling method relating to the network of FIG. 3.

FIG. 5 illustrates a prior art signaling method illustrated in conjunction with the network of FIG. 3. In step 510, a request for a connection from edge node 210A to edge node 210C arrives at node A. The connection request may be, for example, a connection requirement of 2 Gbps (Giga bits per second). In step 520, the route selection procedure chooses a route, for example route ABC, from the appropriate route-set. In step 530, edge node 210A sends a connection request to node 210B. It is assumed that link A-B has sufficient capacity to handle the connection request. However, suppose that the link B-C, illustrated as link 310-2 in FIG. 3, although it has a total fixed capacity of 10 Gbps, has only 1 Gbps of unused capacity left. Therefore, intermediate edge node 210B determines that link B-C does not have sufficient capacity and denies the connection request. Edge node 210B, in step 540, sends a reply to edge node 210A indicating that the connection request is denied. At this point, edge node 210A receives the reply from step 540 and selects another route, on which the connection signaling steps are repeated. The procedure continues until the connection is accepted, or the route-set is exhausted.

Therefore in the prior art connection signaling method, based on the state of various links, intermediate edge nodes make reservations for the new connection before forwarding the connection requirement to next intermediate edge node along the selected route. However, if a connection is refused, no link-state information can be properly maintained.

Connection Signaling Method for the Tracking of Constituent Traffic

Figure 6:
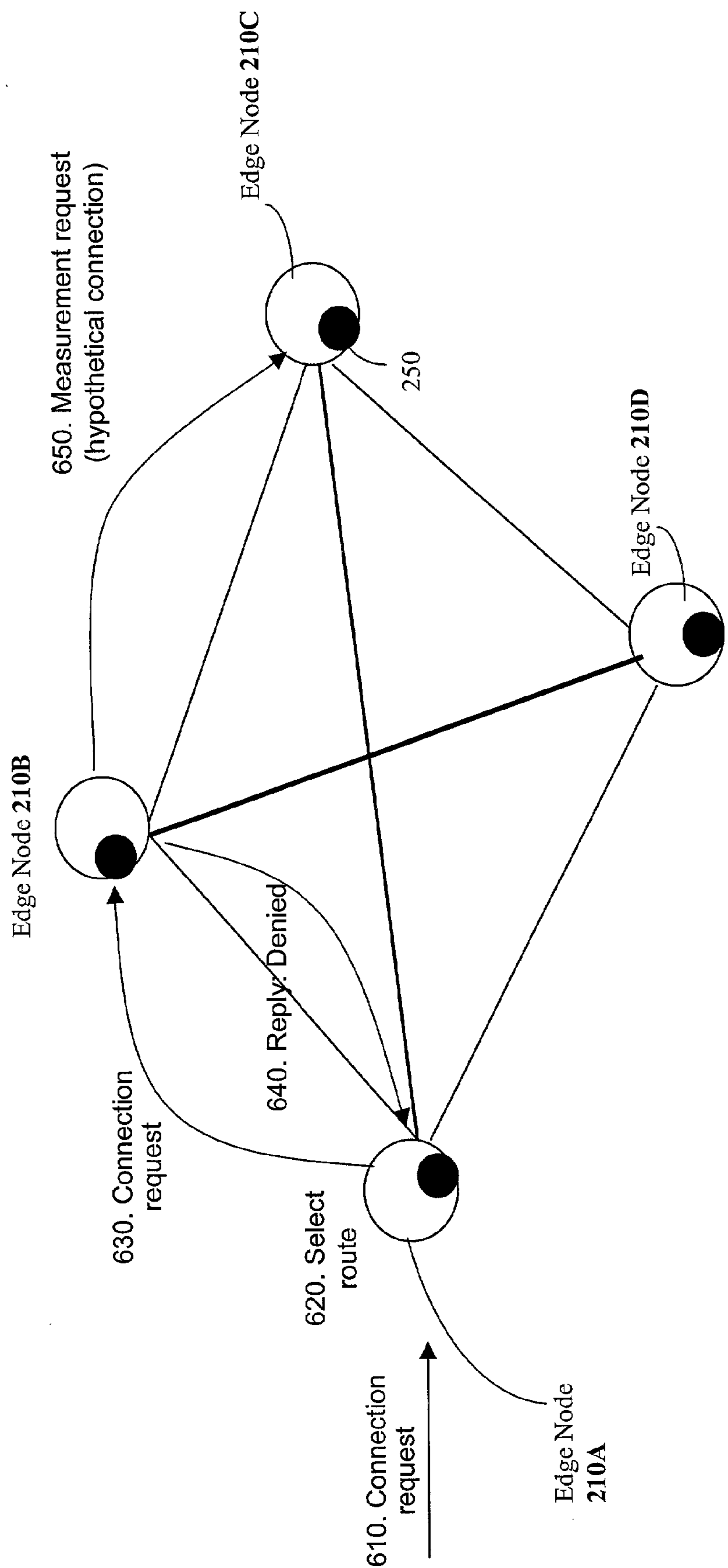
FIG. 6 illustrates a connection signaling method for the tracking of constituent traffic according to an embodiment of the invention.

A connection signaling method for the tracking of constituent traffic according to an embodiment of the invention is illustrated in FIG. 6. This improved connection signaling method requires that a connection requirement be forwarded end-to-end even when an intermediate edge node denies the connection.

In the improved connection signaling method illustrated in FIG. 6, steps 610 and 620 are the same as steps 510 and 520 respectively, of the prior art connection signaling method in FIG. 5. However, in the case of the improved method illustrated in FIG. 6, the connection request sent in step 630 indicates that measurements must be taken along the entire end-to-end route. Therefore, after edge node 210B denies the connection in step 640, in subsequent step 650, edge node 210B forwards a measurement request to node 210C, the next node in the route. The measurement request can be viewed as a hypothetical connection request, asking the node to record whether it would have accepted the request, had it not been rejected by a previous node. Such forwarded measurement requests as in step 650 may be repeated until the connection requirement reaches the sink edge node, which is edge node 210C in this example.

When the connection requirement reaches the edge controller 250 of the sink edge node 210B said controller sends a reply, in step 640, to the edge controller of the previous edge node. The reply is sent backwards along the selected route towards the source edge node. This step 640 is followed until the reply reaches the source edge node. An intermediate edge controller, upon receiving the reply, commits the reservations made against the connection requirement when the reply indicates success. However when the reply indicates that the connection is denied, the edge controller releases any reservations made against the connection requirement. Upon receiving the denied-connection reply, the source edge controller selects the next available route in the route-set and repeats signaling over it as explained above. The route-selection step is repeated until either the connection is accepted over a route or all routes in a route-set have been tried. This process will be further described with reference to FIGS. 10 to 15.

Therefore, in accordance with this improved connection signaling method, when an edge controller determines that it is unable to accommodate the connection, it can be requested to collect the state information of edge-to-edge links. This allows state collection along a route even when a connection is denied. However, collecting state over limited routes optimizes state collection. A source edge node can attach a primary-tag to a connection request over limited routes, preferably the topmost route. An intermediate edge node thus collects the state information upon inability to accommodate connection requirement over its edge-to-edge links along the selected route only for primary-tagged connection requirements. When a connection request is denied for primary-tagged connection requirements over topmost routes, source edge controller can signal untagged connection requirements over the other routes. However, if connection requests are repeatedly denied over the topmost route, the source edge controller can be configured to attach the primary-tag connection requests over the next few routes in the route-set.

Routing Index and Route Depth

A routing index is a metric associated with a route-set that measures the result of the route selection procedure. In a preferred embodiment of the present invention, network information sent from the first stratum 110 to the second stratum 120 for determining resource allocation requirements includes the routing index. The routing index may be based on any appropriate characteristic. The routing index will be described below with respect to the characteristics of route depth, constituent traffic, and traffic classification with respect to defined thresholds.

In a preferred embodiment, the routing index is based on the depth of the routes within a route-set at which connection are setup successfully. With reference to FIG. 4, if a connection is setup over route ACB, the depth of this route is 2. If a connection request is denied on all routes in the route set, the route depth for that denied connection request is assigned a pre-determined value, which may be the maximum depth of the route-set plus one.

In the intermediate timescale T2, which is a millisecond timescale in this embodiment, measurements made by edge controllers are analyzed and requirements for resource allocations are identified. The timescale for carrying out resource allocation is preferably in milliseconds. The source edge controllers calculate the routing index for route-sets in this millisecond timescale. For example, the routing index can be the average depth of the routes weighted by the capacity of the connection requests, calculated as:

$$\Sigma(D_j * C_j)/\Sigma C_j \text{ for } 0 \leqq j < N$$

where $D_j$ is the route depth assigned to the connection request of capacity requirement $C_j$ and N is total number of connection requests received against the route-set during the period of measurement. The capacity $C_j$ may be defined in terms of bandwidth, data rate, bit rate, byte rate, or any other suitable measurement.

In another embodiment, the edge controllers may also be configured with a predetermined threshold value of the route-set metric, for example, a threshold for depth of route-sets. When the overall routing index for a route-set exceeds the threshold, the source edge controller marks the top route in the route-set for an increase in resource allocations. Preferably only the top routes in a route-set whose overall routing index exceeds the threshold are slated for increase in resource allocations.

Routing Index and Constituent Traffic

FIG. 7 illustrates an example of a constituent traffic table that an edge controller 250 could maintain for its edge-toedge links to classify and quantify constituent traffic. Whenever a connection is setup, or constituent traffic measurement is requested for a connection, the edge controller updates the values for Primary Traffic 711 or Secondary Traffic 712 by adding the connection capacity in the column corresponding to the edge-to-edge link over which the connection is requested. Primary traffic refers to setup tagged connection requests over primary routes to which an edge-to-edge link belongs, whereas secondary traffic refers to untagged connection requests carried over secondary routes after being rejected by other primary routes. This process will be further explained with reference to FIGS. 10 to 15.

Primary Traffic 711 is updated when the connection request is tagged while Secondary Traffic 712 is updated for an untagged connection request. However, when a tagged connection request cannot be accommodated, Rejected Traffic 713 is updated. When a connection is removed, Primary Traffic 711 or Secondary Traffic 712, depending upon how the connection was setup, is decreased by the connection capacity allocation value in the column corresponding to the edge-to-edge link. Edge-to-edge links can be labeled into categories indicating a requirement that the resources of a link be increased, maintained, or decreased, based on the constituent traffic and network rules. For example, according to one rule, if constituent traffic is 85 percent primary while remaining 15 percent is secondary, the edge-to-edge link is placed in the category for a resource increase if the denied traffic is more than 30 percent of the total carried traffic. The data in FIG. 7 are expressed in arbitrary units.

After every measurement period, edge controllers 250 can report the state for facilitating decisions in correcting resource allocations. Within the millisecond timescale mentioned earlier, the measurements made across edge controllers 250 are analyzed and requirements for resource allocations are sent to the resource allocation means 102, shown in FIG. 1. For all routes slated for increase in resources during a measurement period as described earlier, requirements for resource allocations maybe sent for edge-to-edge links having the highest connection-rejection rate. Other intermediate edge nodes may also send resource allocation requirements for edge-to-edge links having the highest connection-rejection rate. Edge controllers may also offer to reduce the use of existing resources over edge-to-edge links having low occupancy and mark the offered resources as unavailable for their routing function. According to yet another aspect of this embodiment, the requirement for resource allocations can also include indications for overall routing index calculated against a route-set that serves as a severity indication for resource allocation. Another indication to be included is a measure of connection requests that could not be accommodated during the measurement period. This indication allows the processing entity to also determine the amount of the allocations.

Routing Index and Measuring Efficacy of Route Selection

The routing index may also be used to measure the efficacy of route-selection. Regardless of which characteristic the routing index is based on, according to another embodiment of the invention, the efficacy of the routing function can be measured based on collective efficacy of route selection for connections signaled during the period of measurement. The period of measurement preferably coincides with the next timescale associated with corrections in the allocation of resources to the various routes. The corrections in the resource allocation, as explained later, typically occur in millisecond timescale. As mentioned earlier, the efficacy of route-selection is measured with the routing index for route-set and is carried out on the same timescale at which the routing function runs, i.e., microsecond timescale. Also described earlier is an improved connection signaling method for collecting state information for denied connections over selected routes. Edge controllers are involved in these measurements such that source edge controllers measure the routing index during route selection and all edge controllers, including source edge controller, collect state information for tagged requests for connections. The measurements allow for learning with respect to the effectiveness of the network to handle traffic connections. These measurements further permit the identification of requirements, or corrections, that must be implemented to better adapt the network.

The state collection for a tagged connection request allows the edge-to-edge links to be classified under three possible states that further allow the edge-to-edge links to be labeled with three different colors. Edge-to-edge links are labeled red when their state does not allow them to accommodate more connection requirements. Such a state indicates blocking and a blocking metric can be calculated based on the ratio of rejected tagged connection requirements against the total connection requirements. Some of the remaining links are labeled green when the state indicates a vacancy greater than a pre-determined vacancy threshold. All other remaining edge-to-edge links are labeled yellow indicating an appropriate allocation of resources. Edge controllers determine these states and label the edge-to-edge links. Such determination is made for each edge-to-edge link emanating from an edge node. According to a different aspect of this embodiment, the constituent traffic across an edge-to-edge link can be identified and classified as primary traffic and secondary traffic. According to this aspect, the state collection for a tagged connection requirement is modified such that a link is labeled red only if its state does not allow it to accommodate more connection requests while currently carrying a majority of primary traffic. It also eliminates the duplicate collection of state since an edge-to-edge link would not be labeled red if it rejects tagged connection requirements while carrying mostly secondary traffic. The classified constituent traffic can also be quantified.

Resource Allocation

Figure 8:
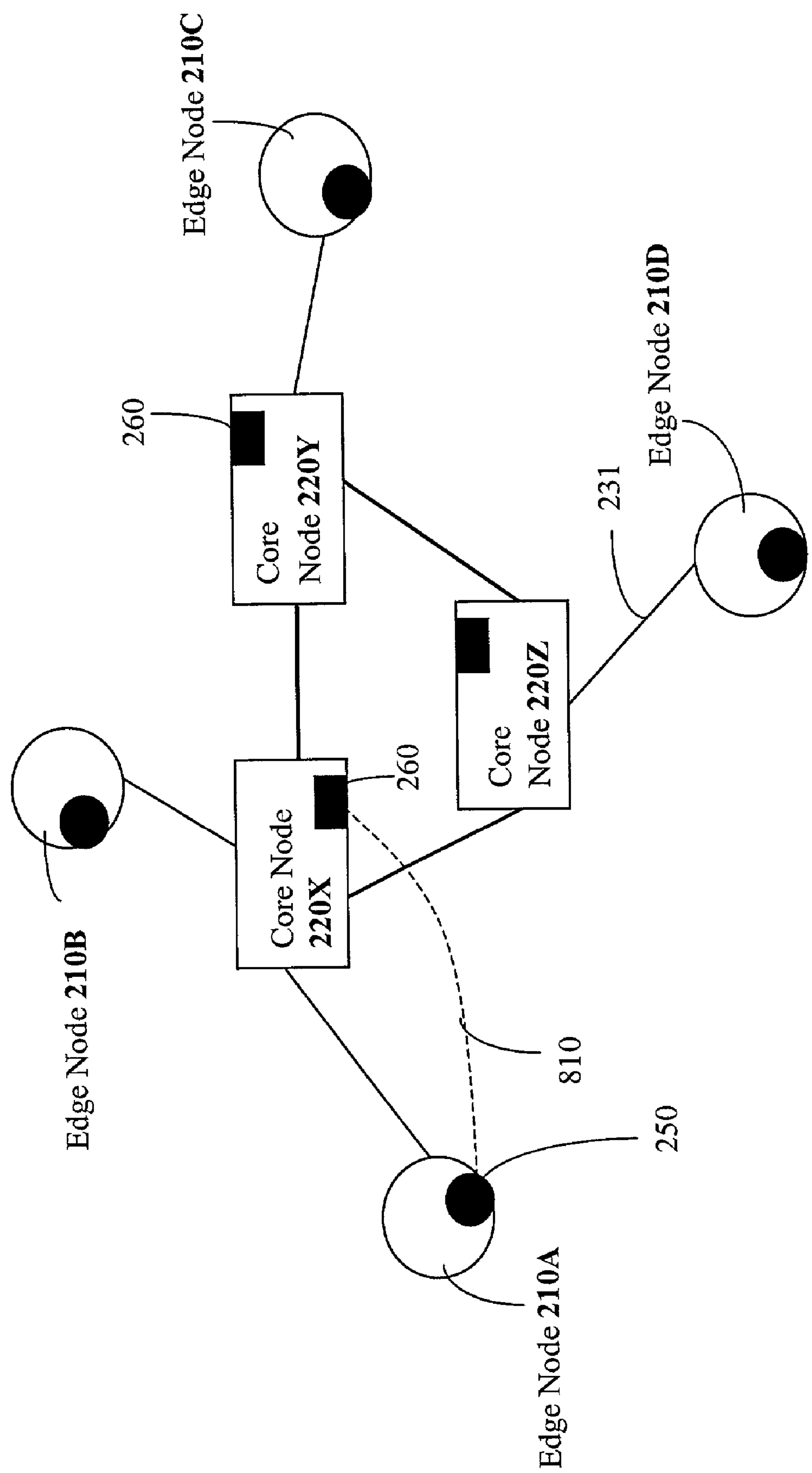
FIG. 8 illustrates the network of FIG. 2 with an edge-core controller link explicitly shown.

FIG. 8 illustrates the network described in FIG. 2 with an exemplary edge-core controller link 810 shown. The edge-core controller link 810 is provided as a means for control information exchange between edge controllers 250 and core controllers 260. The network includes such edge-core controller links 810 for each edge-core combination, although only one such exemplary link is shown in FIG. 8, for simplicity. Such edge-core controller links 810 can be implemented in band or out of band. In-band edge-core controller links can be implemented over the edge-core links 231 that carry traffic connections between edge nodes 210 and core nodes 220, as shown in FIG. 2. Out-of-band edge-core controller links are implemented through dedicated links different from the edge-core links 231 used for carrying traffic.

A resource allocation function operating at resource allocation means 102 (shown in FIG. 1) provides a second degree of control for self-governance. Resource allocation is a function in the second stratum and is implemented by the core controllers. Based on the measurements taken by routing functions implemented on routing means 101, requirements for resource allocations are passed as triggers from the edge controllers 250 to the core controllers 260. Edge controllers 250 also send the releases of allocated resources for some other edge-to-edge links. The requirements for resource allocation and resource release enable the core controllers 260 to configure network resources. The term configuring as used herein refers to the process of capacity allocation so that end-to-end capacity requirements are met. This capacity may be defined in terms of bandwidth, data rate, bit rate, byte rate, or any other suitable measurement.

According to this embodiment, using edge-core controller links 810, correction in resource allocations may be time-coordinated between the edge controllers 250 and core controllers 260. This allows the edge controllers 250 to utilize the corrections in resource allocations as soon as they are made. As an alternative, edge controllers can wait with some guard-time. However, without time-coordination this guard-time would tend to be very high, typically in the order of several milliseconds, and would result in sub-optimal use of resources, as the corrections made would not be utilized immediately.

One mechanism for time-coordination is described in applicant's U.S. patent application Ser. No. 09/286,431, filed on Apr. 6, 1999, and titled SELF-CONFIGURING DISTRIBUTED SWITCH, now U.S. Pat. No. 6,570,872, the specification of which is incorporated herein by reference. In this mechanism, edge controllers 250 send timing packets to core controllers 260 that are time stamped at the core controllers 260 and returned to the edge controllers 250. This allows the edge controllers 250 to adjust their timing according to the core controller. However, when core nodes are interconnected and edge-to-edge links are realized over multiple core-core links, time coordination becomes difficult. For example, for TDM networks, it is difficult to align time frames at the input ports of any bufferless core node, except for a core node that receives data exclusively from source edge nodes. Even if misalignment problem is solved, there is still the problem of time-slot vacancy mismatch, which is difficult to solve without time-slot interchange, which requires the use of buffers. Therefore, according to this embodiment, the network may preferably limit the number of core nodes that together implement a single edge-to-edge link, the number preferably being 1 or 2. This allows the time-coordination to be established as discussed earlier.

Core controllers 260 process the received requirements for resource allocation in order of their severity. The routing index, as discussed in the previous embodiment, indicates this severity. Correction is accomplished by adding the released resources to the pool of free resources and allocating them to different edge-to-edge links based on requirements for allocations. As discussed earlier, these resources can be channels, time-slots, etc. The resource allocations occur in the second timescale, e.g., millisecond timescale, of adaptation to the changes in traffic and network state as indicated by requirements for allocations.

A network, or parts of a network, may not offer means for correction in resource allocations. For example, a static-core network is a network in which the core nodes cannot dynamically allocate channels to the edge-to-edge links. In networks, or parts of networks, where there are no means for dynamic resource allocation, the functions of the intermediate stratum are preferably integrated with the provisioning function of the upper stratum. In this case, the resource allocation function comprises converting resource allocation requirements into resource augmentation requirements, and does not include a step of resource configuration.

Resource Allocation Index and Measuring Efficacy of Resource Allocation

According to yet another embodiment of the invention, the resource allocation function efficacy is measured and reported to functions in the next timescale network function, running on the provisioning means 103. For every resource allocation operation, the efficacy can be measured in terms of success in allocation resources as per the requirement. For a static-core network, as described above, the resource allocation is not performed and is therefore not measured.

Core controllers can calculate a Resource Allocation Index for a resource based on the number of requirements against that resource and failure of resource allocation function in satisfying such requirements. Resource Allocation Index represents a measure of efficacy of resource allocation for said resource. Repeated failure in resource allocation for a resource indicates a repeated need for the resource and repeated failure in allocation. Therefore Resource Allocation Index can be calculated for resources in question by counting the incidence of failures in allocation during a period of measurement. According to this embodiment, the period of measurement for Resource Allocation function coincides with the next timescale that corresponds to the provisioning function, which is described below. The frequency of failures in successfully allocating resources indicates the severity of such resources. Since the requirements for resource allocations are calculated by a routing function and the routing function sends requirements for best routes, a high frequency of failures, as per this embodiment, indicates a need to augment resources for best routes.

Figure 9:
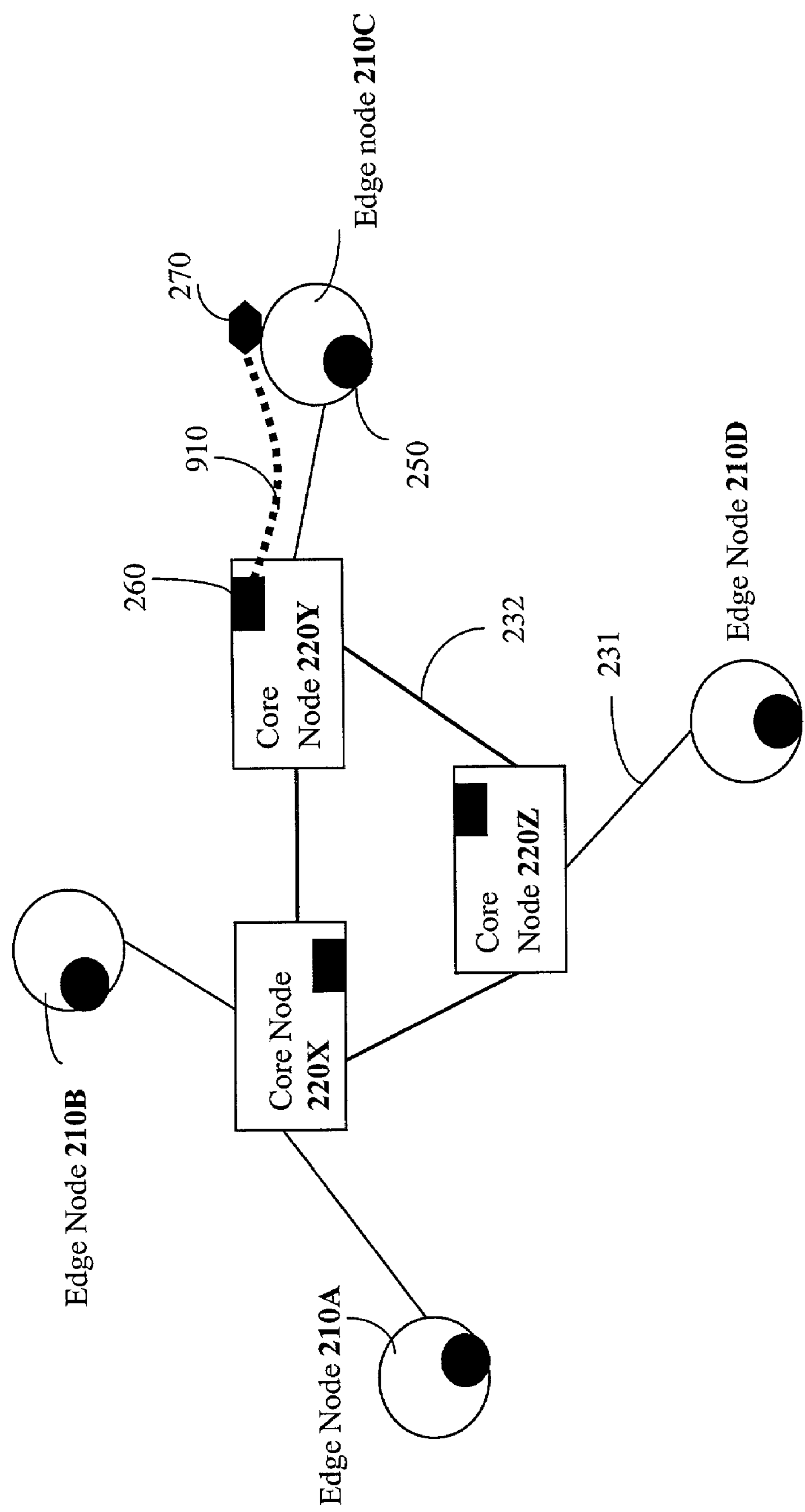
FIG. 9 illustrates the network of FIG. 2 with a core-network controller link explicitly shown.

FIG. 9 illustrates the network described in FIG. 2 with an exemplary core-network controller link 910. The core-network controller link 910 is provided as a means for control information exchange between core controllers 260 and network controller 270. The network includes such core-network controller links 910 for each core node, although only one such exemplary link is shown in FIG. 9, for simplicity. As mentioned earlier with respect to edge-core controller links 810, core-network controller links 910 can be implemented in band or out of band. In-band core-network controller links 910 are implemented over an edge-core link for a network controller co-located with an edge node. In a different arrangement, the in-band implementation could be over core-core links when the network controller is co-located with a core node. Another arrangement for core-network controller links is out-of-band where these links are implemented through separate dedicated links.

The core-network controller links 910 allow control information to be exchanged between core controllers 260 and network controller 270. As described previously, the requirements to augment the resources are sent by the core controllers 260 to the provisioning function.

Therefore, based on the Resource Allocation Index, as discussed earlier, core controllers send requirements for resource augmentation to the provisioning function over core-network controller link 910. The Resource Allocation Index value calculated over the measurement period indicates the severity of these augmentations. For example, the frequency of failure in allocating a resource, observed over a measurement period, is a resource allocation index that can be sent with the augmentation requirement for this resource.

A connection request specifies a source node, a sink node, and a required capacity allocation (bit rate allocation), amongst other parameters. For each source node there is a route set to each sink node. The route set comprises a number of routes, each described by a sequence of nodes. Each edge node preferably stores its route sets to each other edge nodes. Recall that an edge node comprises a source node and a sink node that are integrated to share memory and control.

Figures 10A, 10B:
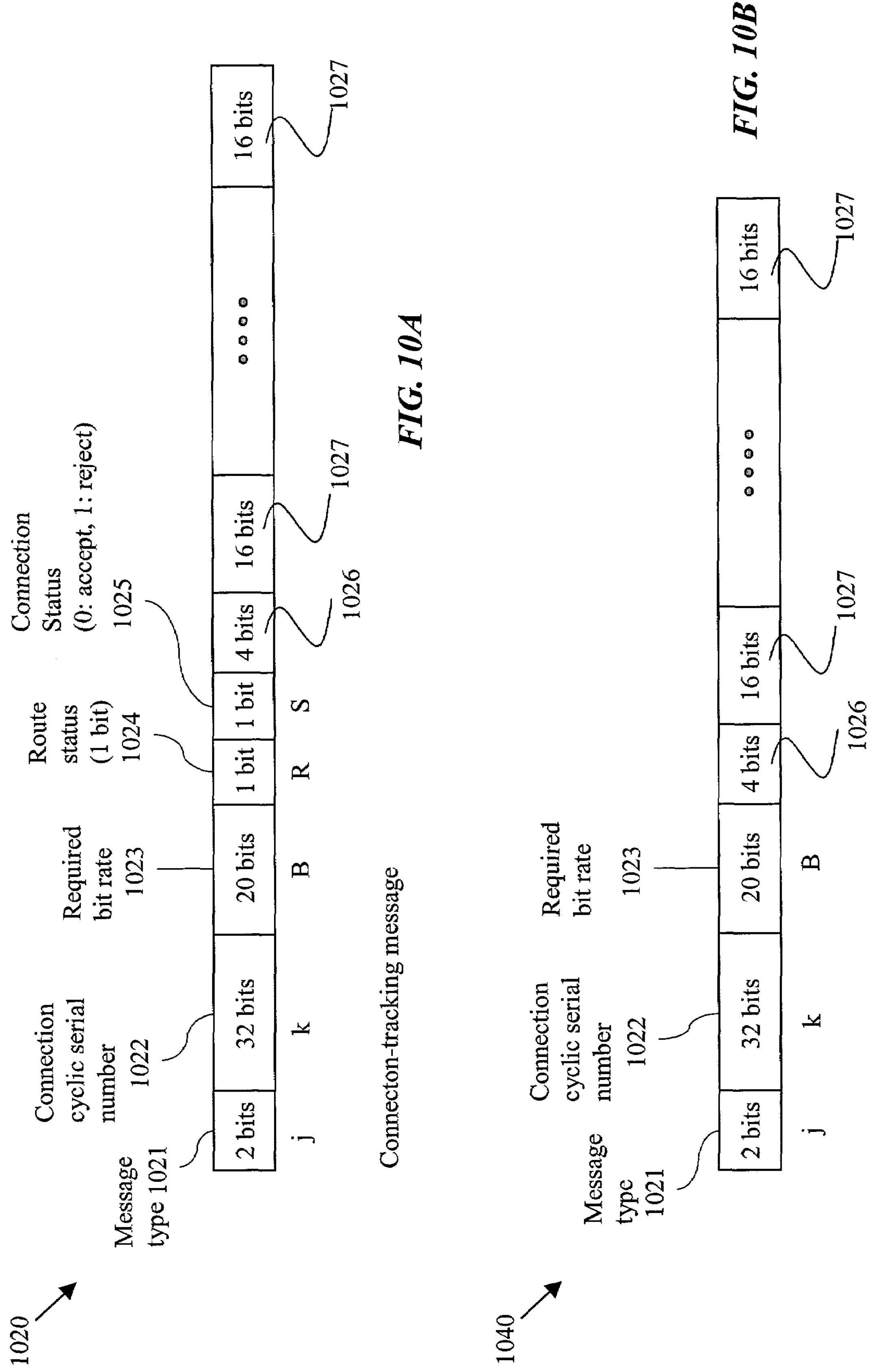
FIG. 10 illustrates a connection-tracking message (FIG. 10A) and a reservation-release message (FIG. 10B), according to an embodiment of the present invention.

FIG. 10A illustrates the structure of a message 1020 serving as a connection-tracking message to facilitate connection admission, route selection, and tracking a connection-request status. Message 1020 has five fields 1021 to 1025 describing the connection request, followed by a description of a route under consideration.

Field 1021 is an identifier of the type of message. When field 1021 is set to equal '00', for example, the message is interpreted to be a connection-tracking message. When field 1021 is set equal to '01', message 1020 is interpreted as a connection-acceptance message. When field 1021 is set equal to '10', message 1020 is interpreted as a connection-rejection message. Field 1022 contains a cyclic connection number. If the field width is 16 bits, for example, then 65536 connections can be tracked simultaneously. Field 1023 contains a representation of the required bitrate allocation for the connection. If the width of field 1023 is 20 bits, for example, then the required bitrate can be expressed with a granularity of $10^{-6}$, where the capacity unit is $10^{-6}$ of the capacity of a channel. For example, if the channel capacity is 10 Gbps, then the capacity unit is 10 Kbps (Kilo bits per second). Field 1024 indicates a status of a route. According to an embodiment of the present invention, the route status assumes one of two values: 0 and1. A route-status of '0' signifies that the route (path) used is the preferred path, hereinafter called a primary route. A route status of '1' indicates that a connection is established over any of the other routes (paths) in the route set corresponding to the source node and sink node of the connection. A route of status '1' is hereinafter called a secondary route. Field 1025 indicates the status of a connection request, with '0' denoting that all previous links along the route has accepted the connection request, and '1' indicates that at least one link along the route has rejected the connection request.

Field 1026 indicates the number of nodes along a route under consideration. Identifiers of the nodes along said route are placed in entries 1027. The number of entries 1027 equals the number of nodes in the route under consideration.

FIG. 10B illustrates a message 1040 serving as a release message to reset any link-capacity reservation along a given route made during an unsuccessful connection-admission over said given route. Message 1040 has a similar structure to that of message 1020. The main differences are that fields 1024 and 1025 are not needed, although they may be kept for uniformity, and the route described in field 1026 and the following entries is a part of a tentative route under consideration. The message has three fields similar to the first three fields of message 1020 followed by a description of a part of a route under consideration, said part preceding a node along the route under consideration at which a connection-request is rejected. When field 1021 is set to equal '11', for example, message 1040 is interpreted as a resource-release message. Optionally, fields 1024 and 1025 may be kept, but not used, in message 1040 so that messages 1020 and 1040 would have the same structure, distinguished only according to field 1021.

Each node along the path maintains a usage record indicating, for each link emanating from the node, the capacity reserved for constituent-traffic in progress, and, hence the available capacity (free capacity) in the link. If the constituent traffic is classified into multiple categories, the usage record would indicate the capacity reserved for each category. According to an embodiment of the present invention, the constituent traffic is categorized according to the route status as described above. Thus, a usage record indicates capacity reservation for two types of constituent traffic.

Figure 11:
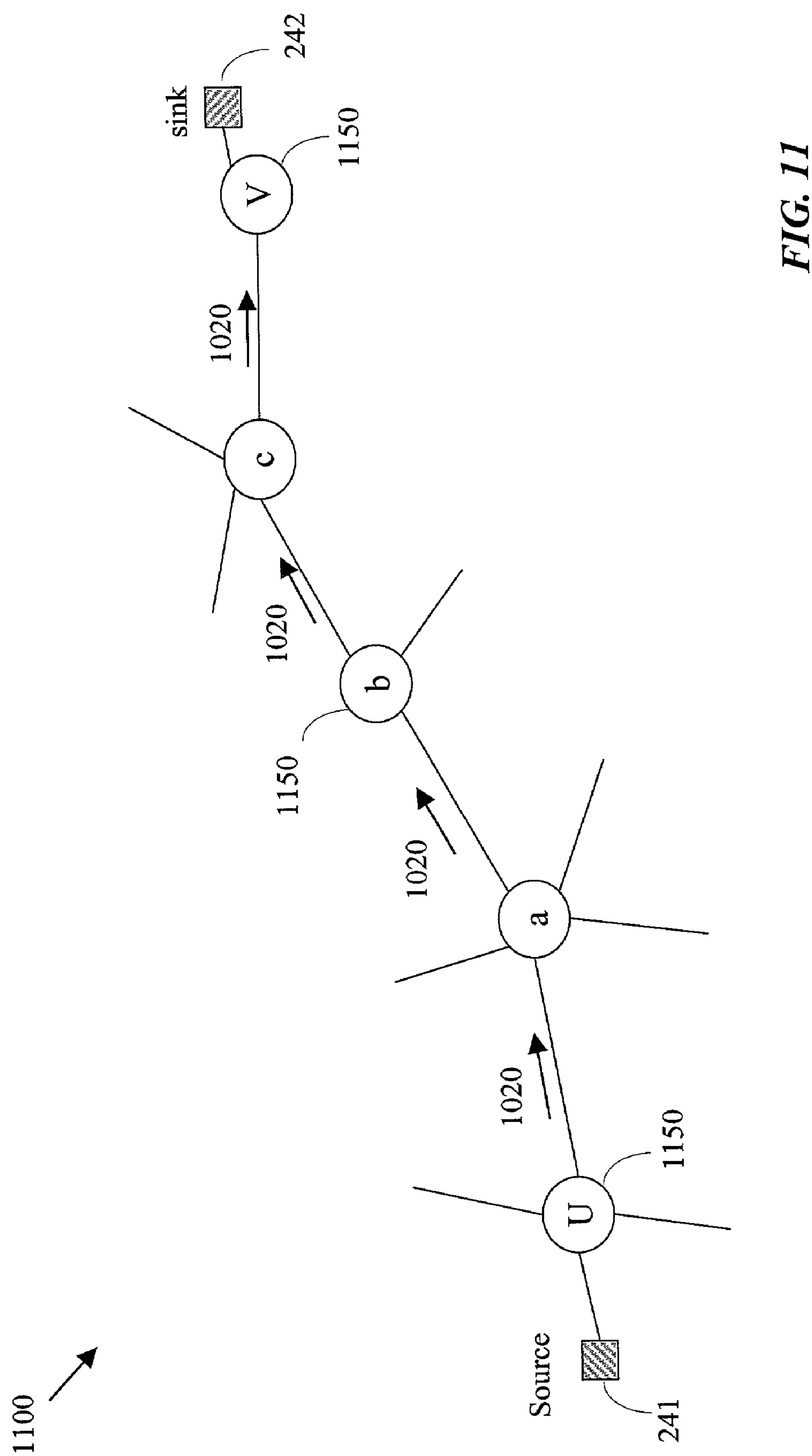
FIG. 11 illustrates the flow of a connection-tracking message in an exemplary primary route, according to an embodiment of the present invention.

FIG. 11 illustrates a single route in a route set for node pair {U, V}, U being a source node and V being a sink node. In the route description of FIG. 11, a generic representation is used, with no distinction being made between an edge node and a core node. The nodes along the path from source node U to sink node V are referenced as 1150, and each represents either an edge node or a core node. Naturally, connection requests originate only from an edge node (source node). However, in a general network structure, intermediate nodes along the route may include a mixture of edge nodes and core nodes. A link may be defined by two edge nodes, regardless of any intermediate core nodes, as illustrated in FIG. 3. Alternatively, a link may be defined by any two nodes that the link interconnects, regardless of node type. The generic representation of FIG. 11 can be adapted to represent a route defined by a sequence of edge nodes or a route defined by a sequence of edge nodes and core nodes. FIG. 11 indicates a successful connection attempt where a connection-tracking message 1020 propagates successfully from one node 1150 to the next along the designated path. In anticipation of connection-request acceptance along the selected route, at each node, the link usage record containing the reserved capacity for constituent traffic is updated to include the requested capacity of the connection.

Figure 12:
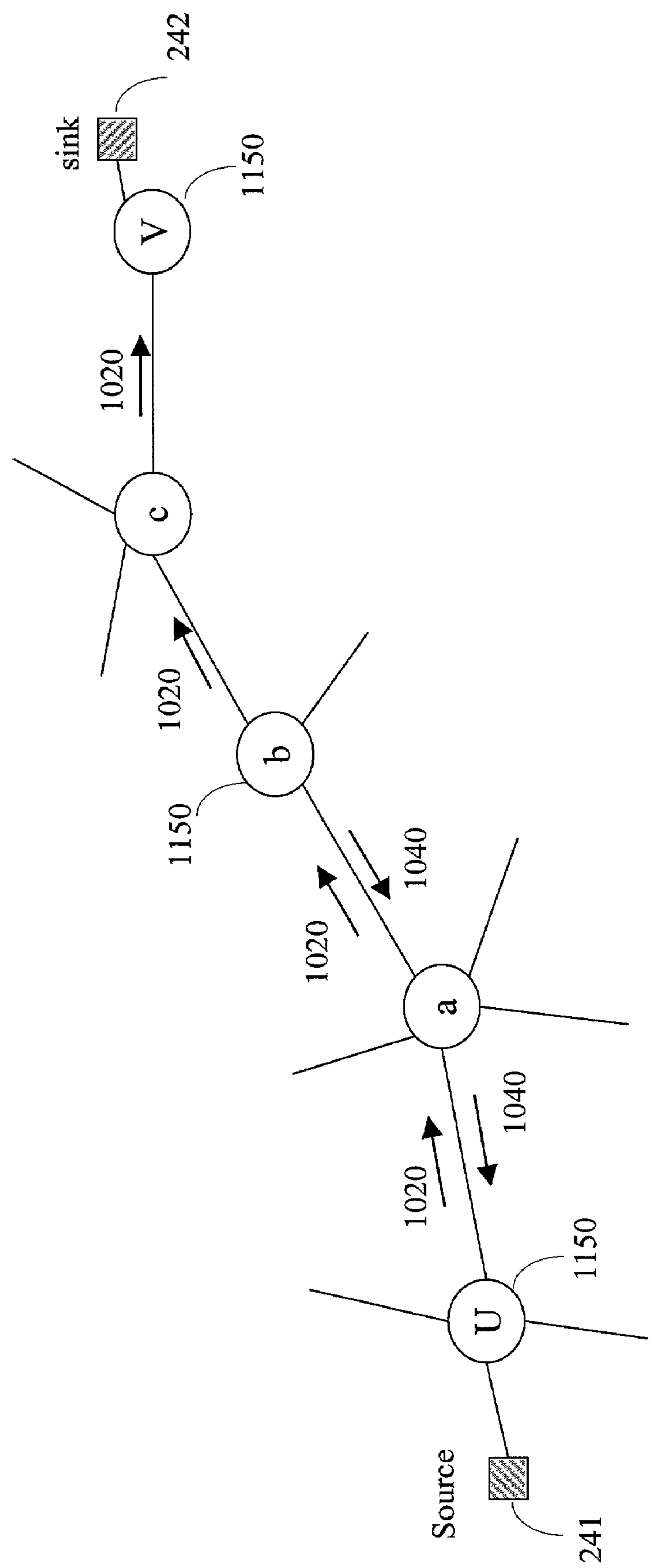
FIG. 12 illustrates the flow of a connection-tracking message and a reservation-release message in an exemplary primary route, according to an embodiment of the present invention.

FIG. 12 illustrates a main feature of an embodiment of the present invention wherein a connection request is rejected at intermediate node 1150, labeled as node 'b', and referenced as node 1150(*b*). Other nodes are referenced likewise. The connection request is rejected because the link from node 1150(*b*) to node 1150(*c*) does not have sufficient free capacity to accommodate the connection request. Despite the rejection, the connection-tracking message 1020 continues to propagate towards the destination node 1150(V). At each node along the route from source node 1150(U) and before node 1150(*b*), at which the connection-request was rejected, the link usage record is updated to include the requested capacity of the connection, in anticipation of successful admission, as described above. When the request is rejected, the connection-tracking message 1020 carries an indication of the rejection in field 1025 and, therefore, subsequent nodes along the route from node 1150(*b*) to the destination node 1150(V) do not modify the link usage records along the rest of the route. The sole purpose of continuing the connection admission process beyond node 1150(*b*), despite the rejection, is to acquire measurements regarding the capacity of the route, if the route is a primary route.

Figure 13:
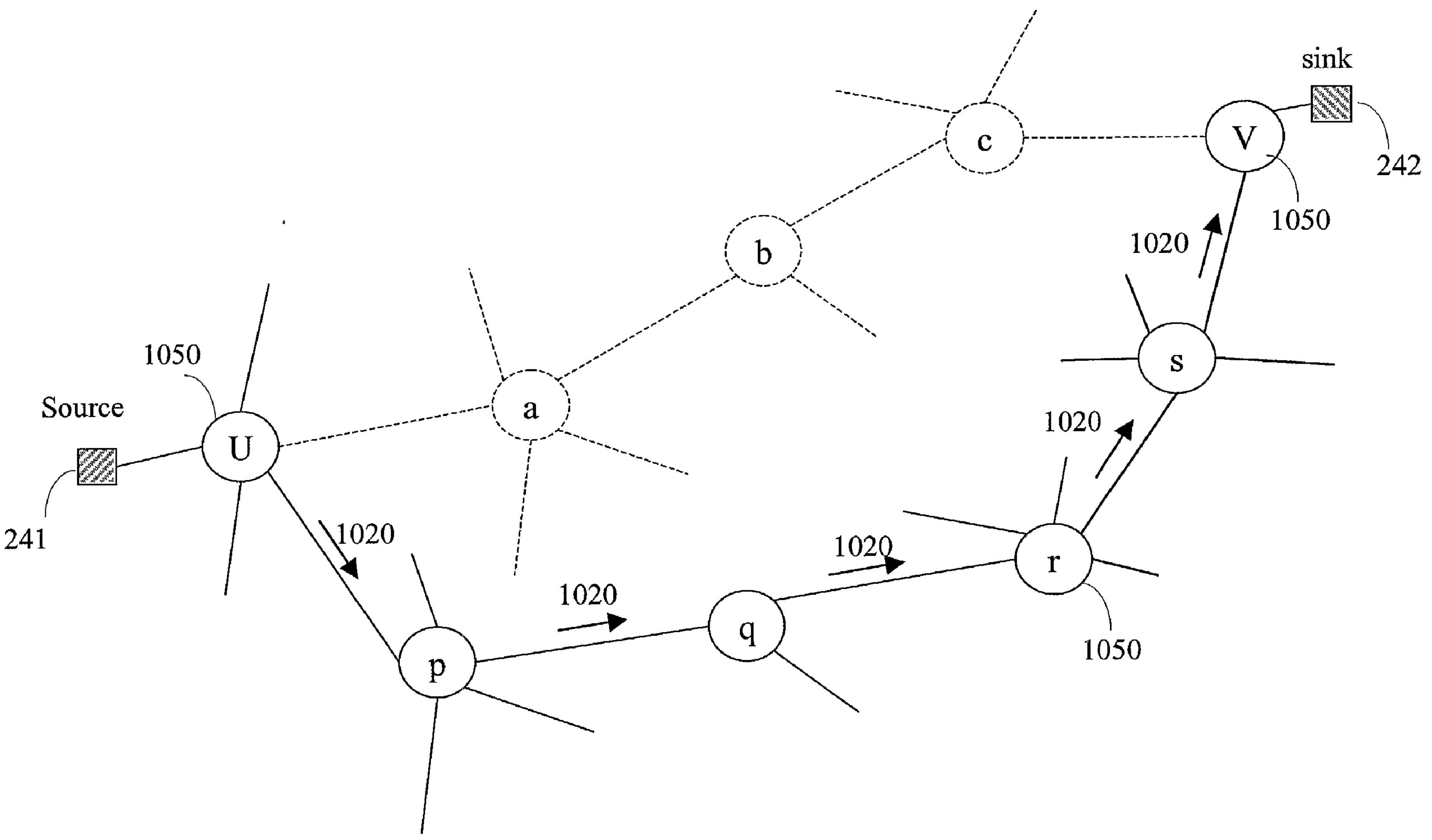
FIG. 13 illustrates the flow of a connection-tracking message in an exemplary secondary route, according to an embodiment of the present invention.

FIG. 13 illustrates the use of a secondary route, i.e., a route other than the preferred route, due to failure to accommodate the requested connection along the preferred (primary) route. In the example of FIG. 13, the secondary route traverses intermediate nodes 1150(*p*) to 1150(*s*) and the connection is successfully routed to destination.

Figure 14:
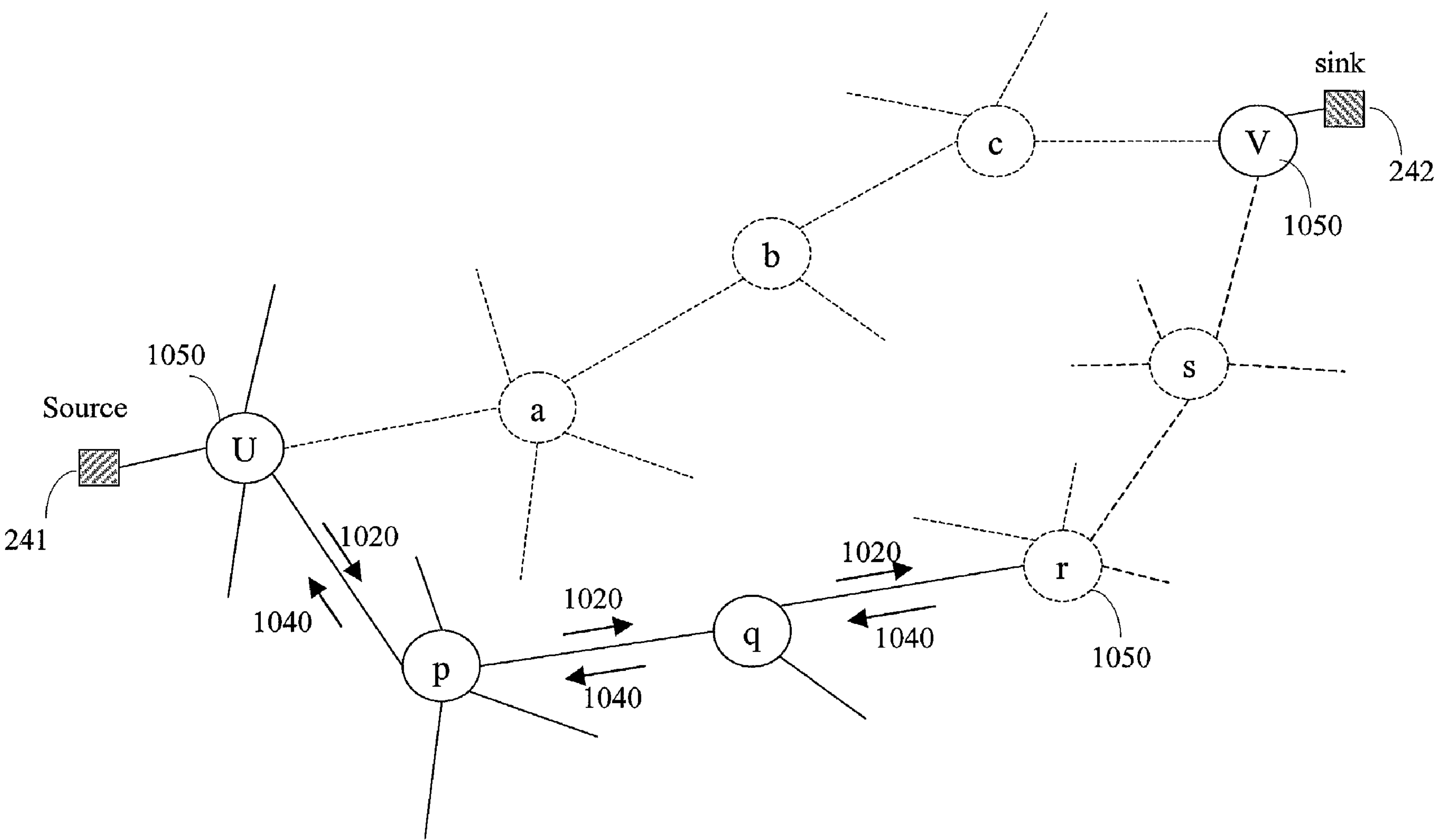
FIG. 14 illustrates the flow of a connection-tracking message and a reservation-release message in an exemplary secondary route, according to an embodiment of the present invention.

FIG. 14, illustrates a scenario similar to that of FIG. 12, with the exception that the route is a secondary route having intermediate nodes 1150(*p*) to 1150(*s*), as described with reference to FIG. 13, but with the connection request rejected due to insufficient capacity along the link from node 1150(*r*) to 1150(*s*). Because the route is a secondary route, the connection-tracking message 1020 need not propagate beyond node 1150(*r*) at which the connection request was rejected.

Restated, the above described process combines connection admission and route selection with a procedure for collecting network-state information to enable a higher network-control stratum to take measures to reconfigure the network, either on a dynamic basis, through rearrangement of allocated transport resources, or on a provisioning basis, where network transport (and hence switching) resources are enhanced to accommodate changing traffic demand.

Figure 15:
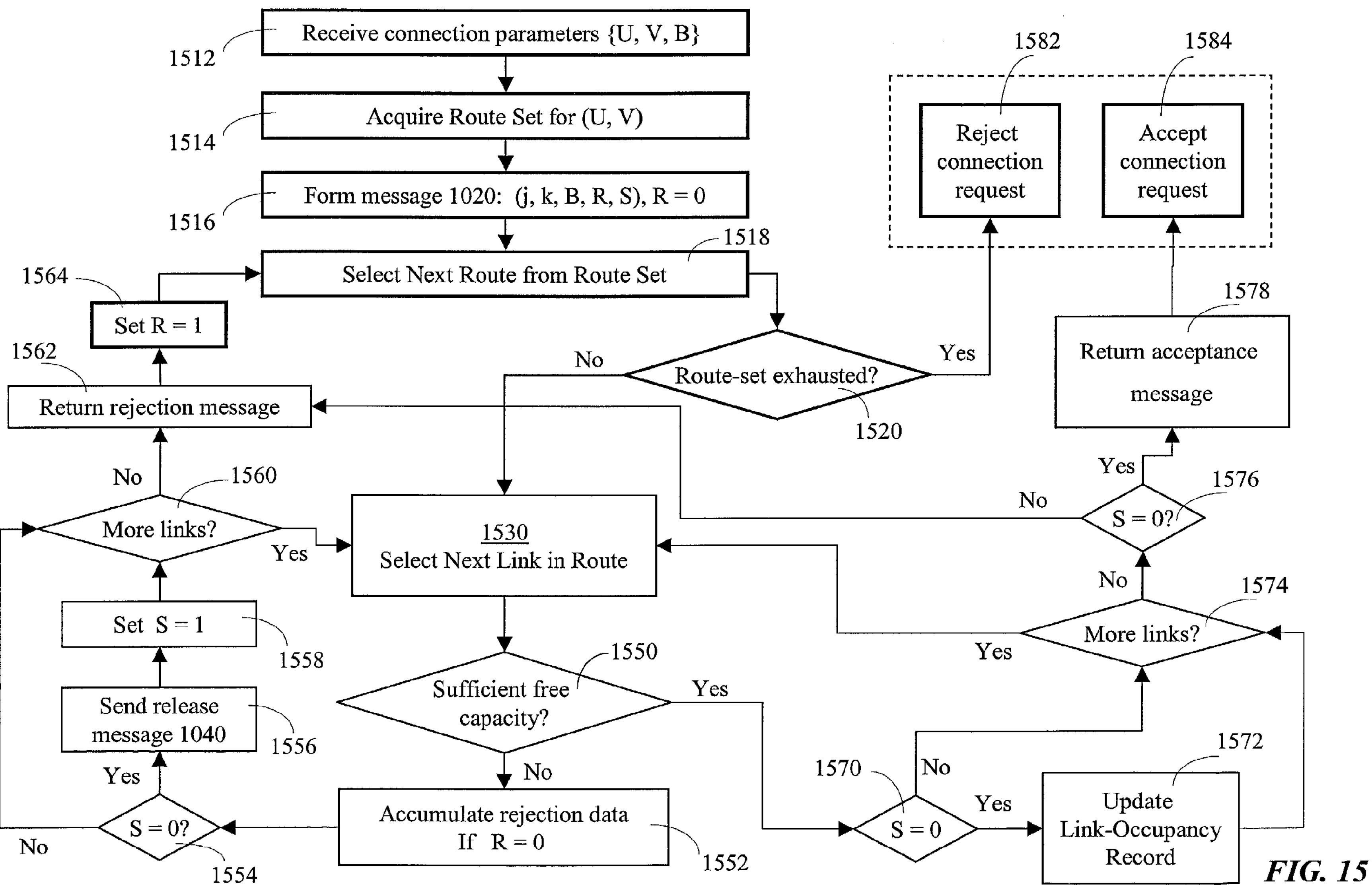
FIG. 15 is a flow chart illustrating a process of combining connection admission, route selection, and collection of network-state information, according to an embodiment of the present invention.

FIG. 15 is a flow chart describing the above process. In step 1512, an edge node (a source node) receives a connection request from a traffic source 241. Connection parameters U, V, and B are associated with the connection request, where U and V identify the source node and sink node, respectively, and B is the required capacity (bit rate) for the connection.

In step 1514, the source node acquires the route set for node pair (U, V). The route set would normally be stored in a route-set memory (not illustrated) in said source node. In step 1516, a connection-tracking message 1020 having parameters j, k, B, R, S is formed by the source-node controller, where j is set as '00' (for example) indicating to each traversed node that the record is a connection-tracking message. The parameter k is a cyclic connection number as described above with reference to FIG. 10A. The parameter B is an indicator of the required capacity (bit rate) allocation. The parameter R is a route status, herein selected to be either '0' or '1' in a two-state classification scheme, although a classification scheme of arbitrary number of states can be employed. A route status of '0' signifies that the route in use is a preferred (primary) route. The parameter S is a flag indicating to each traversed node 1150 whether the connection request has encountered any rejection in at least one of the preceding nodes along the path. The value of S is '0', if no rejections were encountered along a preceding part of a route under consideration, and '1' if at least one rejection took place.

In step 1518, the next route in a route set is selected, if the route set is not yet exhausted. A route set is pre-sorted according to some merit criterion including route length. Initially, the next route is naturally the first route. For the purpose of illustrating the above combined connection admission, route selection, and network-data collection, the first route in the route set is treated as a primary route, which is given a status of '0'. All other routes, if any, in the route set are treated as secondary routes, each of which is given a status of '1'.

In step 1520, the route set is examined to determine whether there are still routes that have not been considered for accommodating the requested connection. If all routes in the route set have been considered, the connection request is rejected, and the rejection processing is handled in step 1582. This point is reached only when all routes have been unsuccessfully tried. If there is at least one route that has not been considered, control is transferred to step 1530, where a tentative route is to be considered. At step 1530, the next link in the tentative route is examined to determine if it has sufficient free capacity, i.e., unreserved capacity, that is at least equal to the required bit-rate-allocation B. The next link is determined from the route description included in the connection-tracking message 1020. Initially, the next link is the first link in the tentative route.

In step 1550, if the available capacity is insufficient, then a rejection indication must be recorded against the tentative route. The rejection is indicated in the link usage record (FIG. 7). When a rejection is encountered, a release message 1040 is transmitted along the preceding path to correct the reserved capacity in each of the links traversed before rejection took place by subtracting the allocated capacity B. The release message 1040 is routed according to the partial route description included in the release message 1040. It is noted however that the connection-tracking message 1020 continues to propagate along the tentative route and further rejections of the same connection are recorded against respective links if the route is a primary route. However, in any tentative route, a release message is sent only after the first rejection. Thus, in step 1554, if S=0, control is transferred to step 1556 where a release message 1040 is sent backward along the already traversed part of the route under consideration. This is followed by step 1558 at which the value of S is set equal to 1. Step 1554 transfers control to step 1560 if S=1, i.e., if the rejection is not the first one encountered along the route.

As mentioned above, rejection statistics are collected only when R=0. This is indicated in step 1552. A rejection requires that a rejection indication be posted against the link that caused the rejection. The rejection record of a link includes a count of the number of rejections and an accumulation of the bit-rate requests (as indicated by parameter B). The rejection statistics are collected only if the tentative route is the primary route, i.e., if R=0.

In step 1560, if all links of the tentative routes have been examined, then the destination sink node 1150(V) returns a rejection message to the source node. The rejection message is a message 1020 with the first field 1021 set equal to '10'. In step 1564, the source node sets R (field 1024) equal to 1, even though it may have been set as such earlier, and control is transferred to step 1518.

In step 1550, if the available capacity is sufficient, then the value of S (acceptance/rejection indicator) is examined in step 1570. If S=1, control is transferred to step 1574. Otherwise, the usage record of the current link is updated before executing step 1574. At step 1574 if it is determined that all links of the tentative route have been examined, i.e., the destination sink node 1150(V) has been reached, then control is transferred to step 1576. In step 1576 if S=0, i.e., the tentative (candidate) route can accommodate the connection defined in step 1512, then the destination sink node 1150(V) returns an acceptance message (step 1578) to the source node. As described earlier with reference to FIG. 10, an acceptance message is message 1020 with the field 1021 set equal to '01'. If, in step 1576, S is found to be '1', i.e., at least one link in the candidate route does not have sufficient free capacity to accommodate the connection defined in step 1512, then the destination sink node 1150(V) returns a rejection message (step 1562) to the source node 1150(U). The rejection message is a message 1020 with the first field 1021 set equal to '10'. The transfer of the acceptance message or the rejection message back to the source node is performed in a manner well known in the art.

It is noted that, in FIG. 15, steps 1512, 1514, 1516, 1518, 1520, 1564, 1582, and 1584 are implemented only at the source node (source edge node) 1150(U) while the remaining steps are implemented at each node 1150, including the source node 1150(U), along a candidate route (tentative route). It is also noted that steps 1582 and 1584 require that a controller of the source node communicate the result to a traffic source. This communication is performed in any of ways well known in the art.

Provisioning

A provisioning function is preferably performed at provisioning means 103 of the third stratum 130, as illustrated in FIG. 1. In general, lower strata of the self-governing network collect performance measurements, including routing index, resource allocation index, and constituent traffic, and identify overloaded links that are candidates for resource augmentation. They provide a list of these candidate links to the provisioning function. Other information required by the provisioning function, such as the provisioning rules and the provisioning budget, must also be provided. The provisioning function then formulates link-provisioning requirements, by selecting the candidate links that should be augmented and calculating their desired capacity.

The provisioning function produces resource-installation requirements. The provisioning function operates in the long-term time scale, where the horizon can range from weeks to months.

The provisioning function is used to identify the edge-core links 231 and the core-core links 232 that need to be augmented, and to calculate the capacity that needs to be added. As previously described, the routing function on the edge controller 250 collects measurements on the constituent traffic of edge-to-edge links 310, into a table such as the one in FIG. 7, which serves as a link-usage record. The measurements contain the constituent traffic on each link classified in two categories, primary and secondary, and the quantity of rejected traffic. At each provisioning interval, the edge-to-edge link constituent traffic information is translated into edge-core link constituent traffic and core-core link constituent traffic, as described below.

The edge-core link constituent traffic is calculated at the edge controller. An edge-core link is traversed by a plurality of edge-to-edge links. Each edge-to-edge link is mapped to its corresponding edge-core link. The primary traffic, secondary traffic and denied traffic of edge-to-edge links are added up to obtain the constituent traffic of the edge-core link to which they belong. The edge controller obtains, as a result, a table of constituent traffic of all its outgoing edge-core links. Edge-core links where the denied traffic is non-zero, and where primary traffic is above a certain threshold, are considered overloaded and are candidates for a provisioning augmentation. The candidate links are reported by edge controllers to the provisioning function on the network controller 270.

The core-core link constituent traffic is calculated at the core controller 260 with information provided by the edge controller. The edge controller maps its edge-to-edge links to the first core node of each edge-to-edge link. It then sends the constituent traffic of each edge-to-edge link to the corresponding core controller. The core controller maps edge-to-edge links to core-core links and core-edge links. The core controller adds up the primary traffic, secondary traffic and rejected traffic of edge-to-edge links comprised in a core-core link or a core-edge link. The core controller obtains as a result a table of constituent traffic of all the physical links emanating from the associated core node. Links where the rejected traffic is non-zero, and where primary traffic is above a certain threshold, are considered overloaded and are candidates for a provisioning augmentation. Once again, the candidate links are reported by core controllers to the provisioning function on the network controller.

At each provisioning interval, the provisioning function has a resource budget determined by the network operator. Upon the reception of the list of candidate links from the edge controllers and the core controllers, the network controller distributes the resource budget among the candidate links according to established rules. Such a rule can be to distribute the resources in proportion to the amount of rejected traffic on each link. For example, if the resource budget allows 8 units of capacity, and rejected traffic is four capacity units on link A-X, two capacity unit on link X-Y, and four capacity units on link Z-D, the allocation would be 3.2 capacity units on link A-X, 1.6 unit on link X-Y and 3.2 units on link Z-D. In this oversimplified example, the cost associate with a capacity unit is a fixed value, independent of the corresponding link or links.

The provisioning process operates on resources that require human intervention for their allocation. The nature of these resources will vary depending on the network. An example of such a resource is a fiber link, which can require the excavation of a fiber conduit, the installation of transmission equipment, and the installation of interface cards at the nodes. The provisioning function described herein determines requirements for the capacity augmentation of links and nodes that already exist in the network. It explicitly recommends capacity for the links. Implicitly, it also recommends capacity for the nodes, where the capacity of a node is defined as the number of link ports the node comprises.

Constituent traffic measurements may be weighted by time. In general, mapping of edge-to-edge link to core-core link can change over time. One way to alleviate that is to report constituent traffic to core controllers frequently within a provisioning interval, ideally, at every resource re-allocation interval.

Network Provisioning Based on Constituent Traffic Measurements

According to another aspect of the present invention, a formal network provisioning method suitable for today's current data networks is provided. Instead of relying on characterizations based on traffic models, as prior art methods do, the provisioning method according to an aspect of the present invention is based solely on constituent traffic measurements. All triggers sent from lower strata to higher strata are based on constituent traffic measurements. As such, the drawbacks associated with the forecasting of traffic spatial distribution and all forms of traffic models are significantly reduced.

Figure 16:
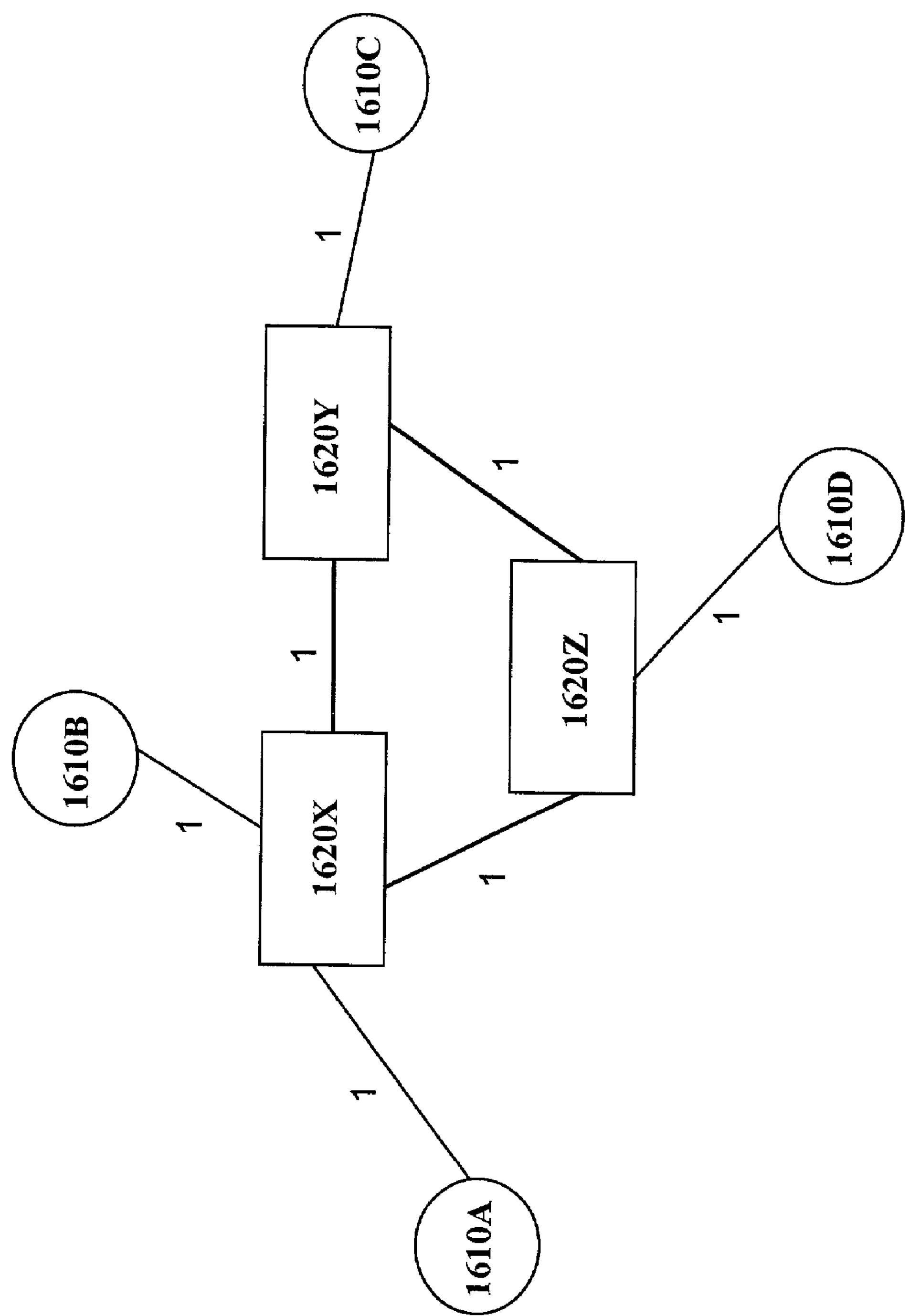
FIG. 16 illustrates a network with physical links connecting edge nodes and core nodes for describing another embodiment of the present invention.

An example operation of the described system is given in conjunction with a network in FIG. 16, wherein edge nodes 1610A, 1610B, 1610C, 1610D and core nodes 1620X, 1620Y, and 1620Z are connected with physical links. The physical links are shown to have an associated number of fibers. Although each fiber may comprise any number of channels, for this preferred example it is assumed that each fiber comprises 5 channels, and that each channel has a fixed capacity normalized to unity. For simplicity, it is assumed that each line connecting two nodes represents two unidirectional physical links in opposite directions, and further that the two links have the same capacity in each direction along the unidirectional links. However, it is clear that the links may have different capacities in the two directions.

Figure 17:
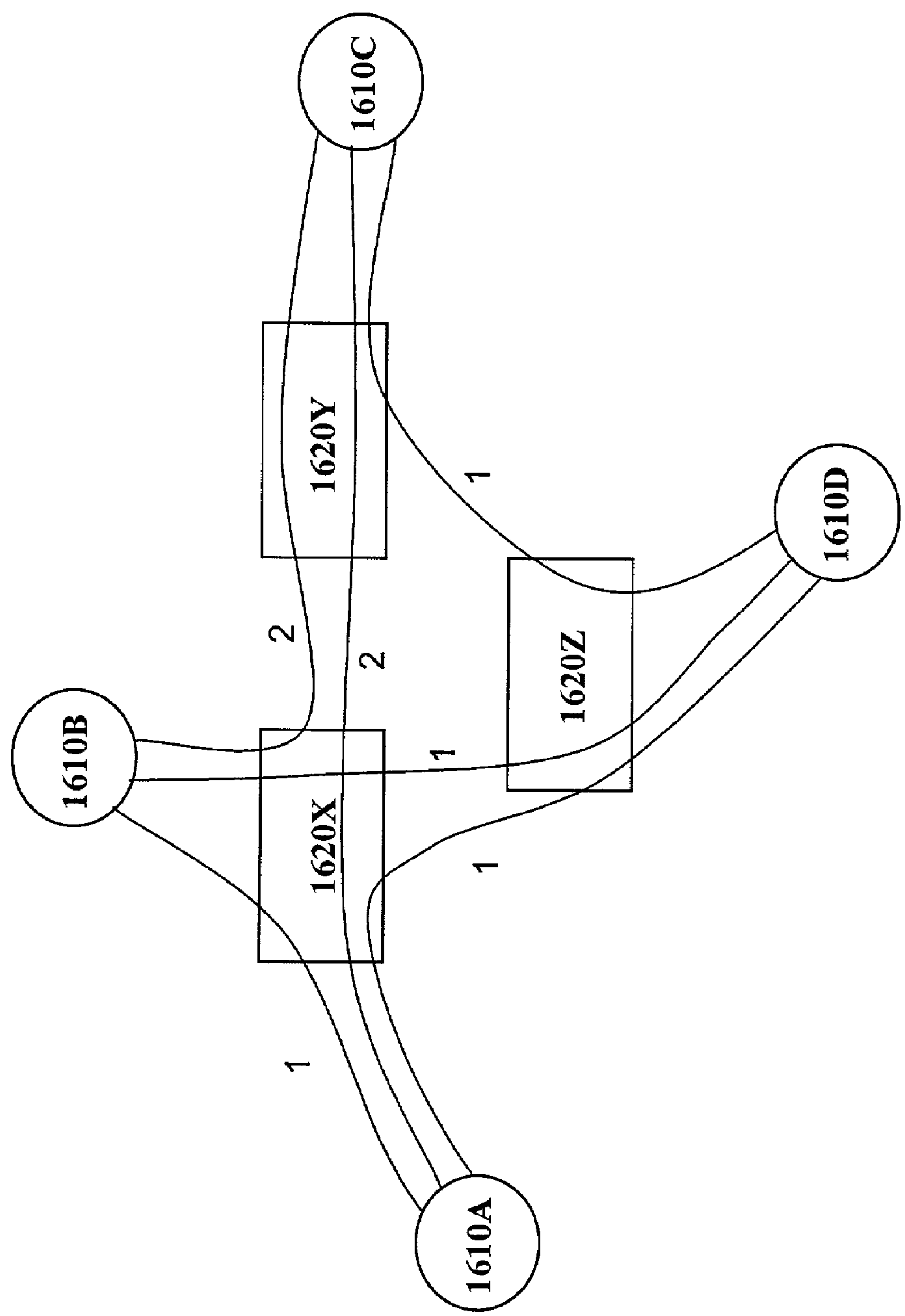
FIG. 17 illustrates the network of FIG. 16 with channels connecting edge nodes through core nodes in an arbitrary configuration.

The channels in the physical links as shown in FIG. 17 are shown to connect edge nodes through core nodes in an arbitrary configuration. Each line connecting two edge nodes represents an edge-to-edge link shown with associated capacity, where capacity is defined by the number of channels in the edge-to-edge link. Note that node A and node B each has one free channel, that node C has no free channels, and that node D has two free channels.

Figure 18:
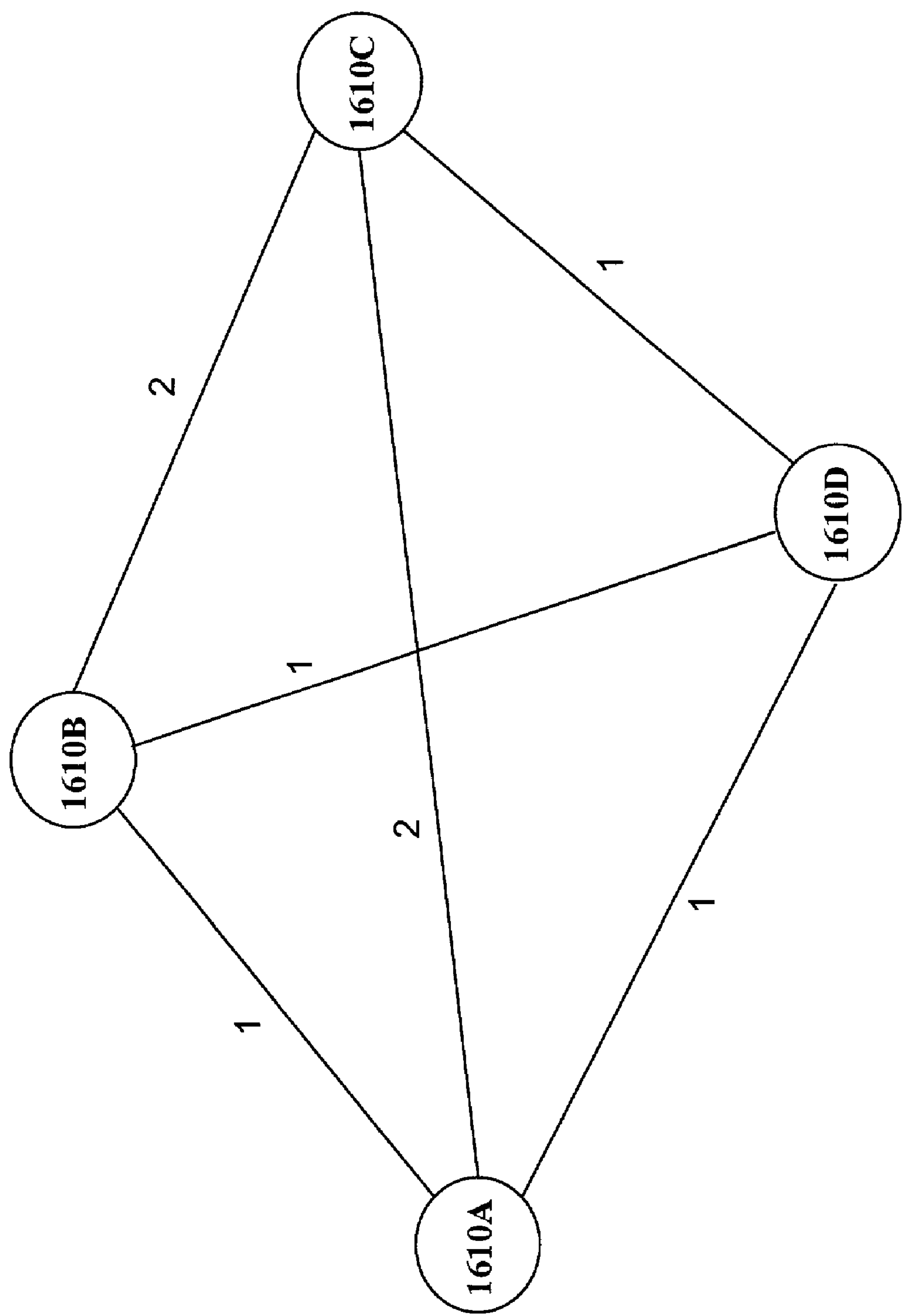
FIG. 18 illustrates another view of the network of FIG. 16, with all links being shown as edge-to-edge links, each with an associated capacity.

Another view of the same network is shown in FIG. 18, wherein each line connecting two nodes represents an edge-to-edge link shown with associated capacity, where capacity is defined by the number of channels in the edge-to-edge link. An edge-to-edge link between node A and node B through core node X may be represented by the notation A-X-B. The link may also be represented by the notation A-B for brevity, where the context does not require mentioning the intermediate core nodes on an edge-to-edge link. In this example, link capacity is normalized to one channel.

Routing

Figure 19:
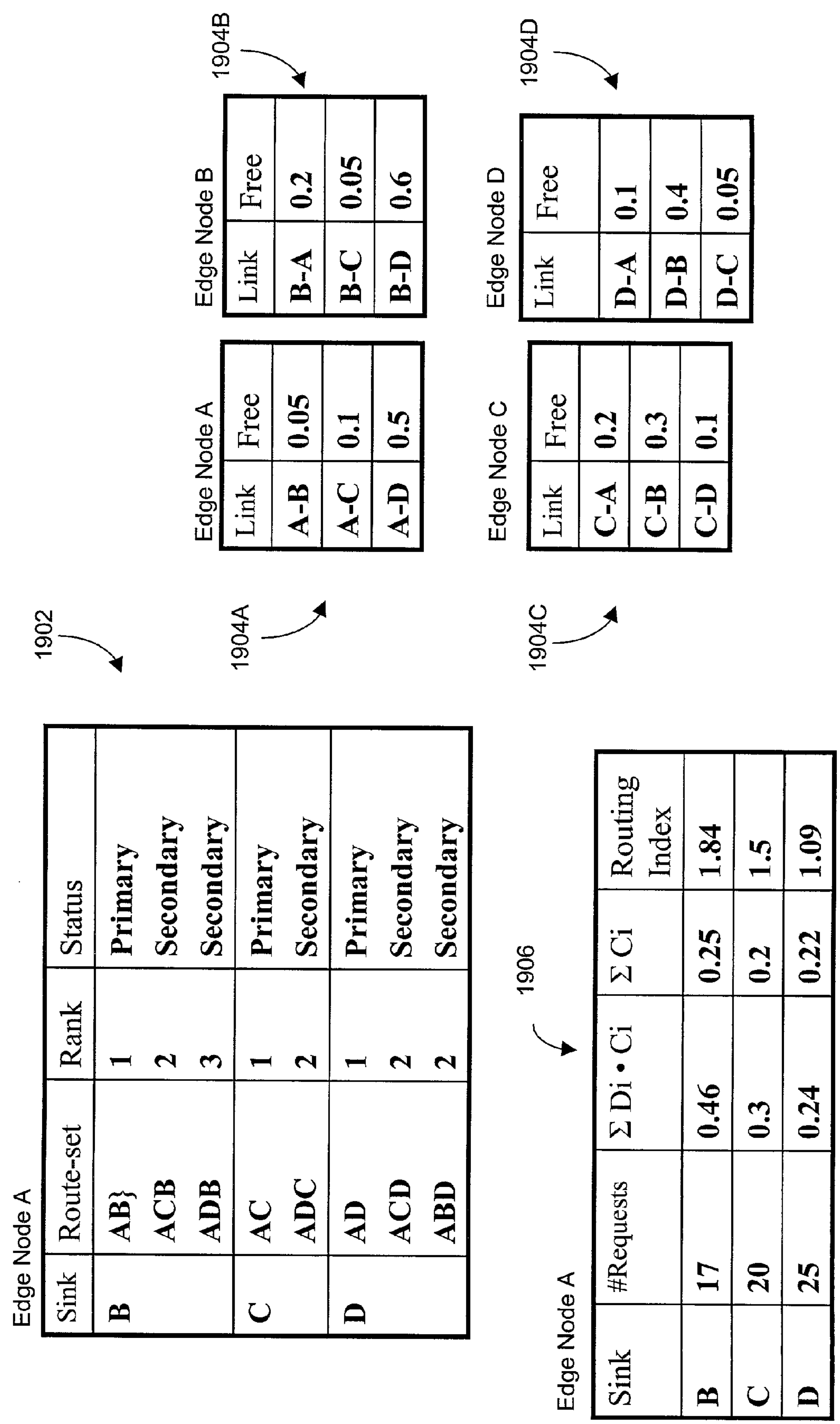
FIG. 19 illustrates a routing table, a routing index table, and link capacity tables for the network of FIG. 18.

Suppose a request for a connection with 0.1 units of capacity from source node A to sink node B arrives at node A. Turning now to FIG. 19, Node A consults the routing table 1902 and selects route AB as the desired route. All routes are assumed to be available in this example; therefore the availability 430 is not shown in table 1902. Node A consults the link capacity table 1904A and determines that it cannot accommodate the connection because link A-B has only 0.05 units of free capacity. In the constituent traffic table 2002A in FIG. 20 (similar to the table of FIG. 7), node A increases the denied traffic on link A-B from 1.7 to 1.8.

Node A consults the routing table 1902 and selects the second route of the route-set to B, route ACB, as the next desired route. Node A consults the link capacity table and determines that link A-C has enough capacity to accommodate the connection request. Node A forwards the connection request to node C, with associated route ACB, capacity of 0.1 units, and a secondary-traffic tag.

Node C receives the connection request, consults the link capacity table 1904C, and determines that link C-B has sufficient capacity to accommodate the connection. Node C forwards the connection request to node B, the destination node. Node B accepts the connection and sends a reply to node C. In table 1904C, node C decreases the free capacity of link CB from 0.3 to 0.2.

Turning briefly to FIG. 20, in constituent traffic table 2002C, node C increases the secondary traffic for link C-B from 5.5 to 5.6. Node C also sends a reply to node A to accept the connection.

Constituent Traffic

Node A receives the reply from node C accepting the connection. It decreases the free capacity of link A-C in table 1904A from 0.1 to 0. In the routing index table 1906, node A increases the number of requests to sink node B from 17 to 18. The route ACB on which the connection is established has a rank of 2 in the route-set. Therefore, in the entry corresponding to sink node B in table 1906, the sum of the product of route depth Di and request capacity Ci is increased by 0.2 from 0.46 to 0.66; the sum of request capacities Ci is increased by 0.1 from 0.25 to 0.35; and the routing index is set to 0.66/0.35=1.89. The updated table 2106 is shown in FIG. 21.

Turning once again to FIG. 20, in the constituent traffic table 2002A, node A increases the secondary traffic on link A-C from 0.8 to 0.9. Tables 2102A and 2102C in FIG. 21 illustrate the updated tables of edge-to-edge link constituent traffic on edge node A and edge node C, respectively.

Resource Allocation

Resource allocation occurs at regular time intervals. At the time of resource allocation, the edge node examines its constituent traffic tables, and determines the links for which the resource allocation should be modified. It is assumed in this example that the criteria to request a resource allocation increase for an edge-to-edge link are as follows: the ratio of primary traffic over secondary traffic is greater than 4, and the ratio of denied traffic over the sum of primary traffic and secondary traffic is greater than 0.05. It is further assumed that the criteria to request a resource-allocation reduction for an edge-to-edge link are as follows: the ratio of denied traffic over the sum of primary traffic and secondary traffic is smaller than 0.0001, and the free capacity of the edge-to-edge link is greater than one unit of capacity.

It is further assumed that at the time of resource allocation in this example, the edge node tables are as calculated with regards to FIGS. 19, 20 and 21. Edge node A calculates the afore-mentioned ratios for its edge-to-edge links with the data of table 2102A. For link A-B, the ratio of primary traffic over secondary traffic is 8.9/1.1=8.09, and the ratio of denied traffic over the sum of primary traffic and secondary traffic is 1.8/(8.9+1.1)=0.18. Link A-B therefore meets the criteria for a resource allocation increase. The other links do not meet the criteria for resource allocation modifications.

Node A sends a request to core node X for an additional channel on the edge-to-edge link A-B.

Figure 22:
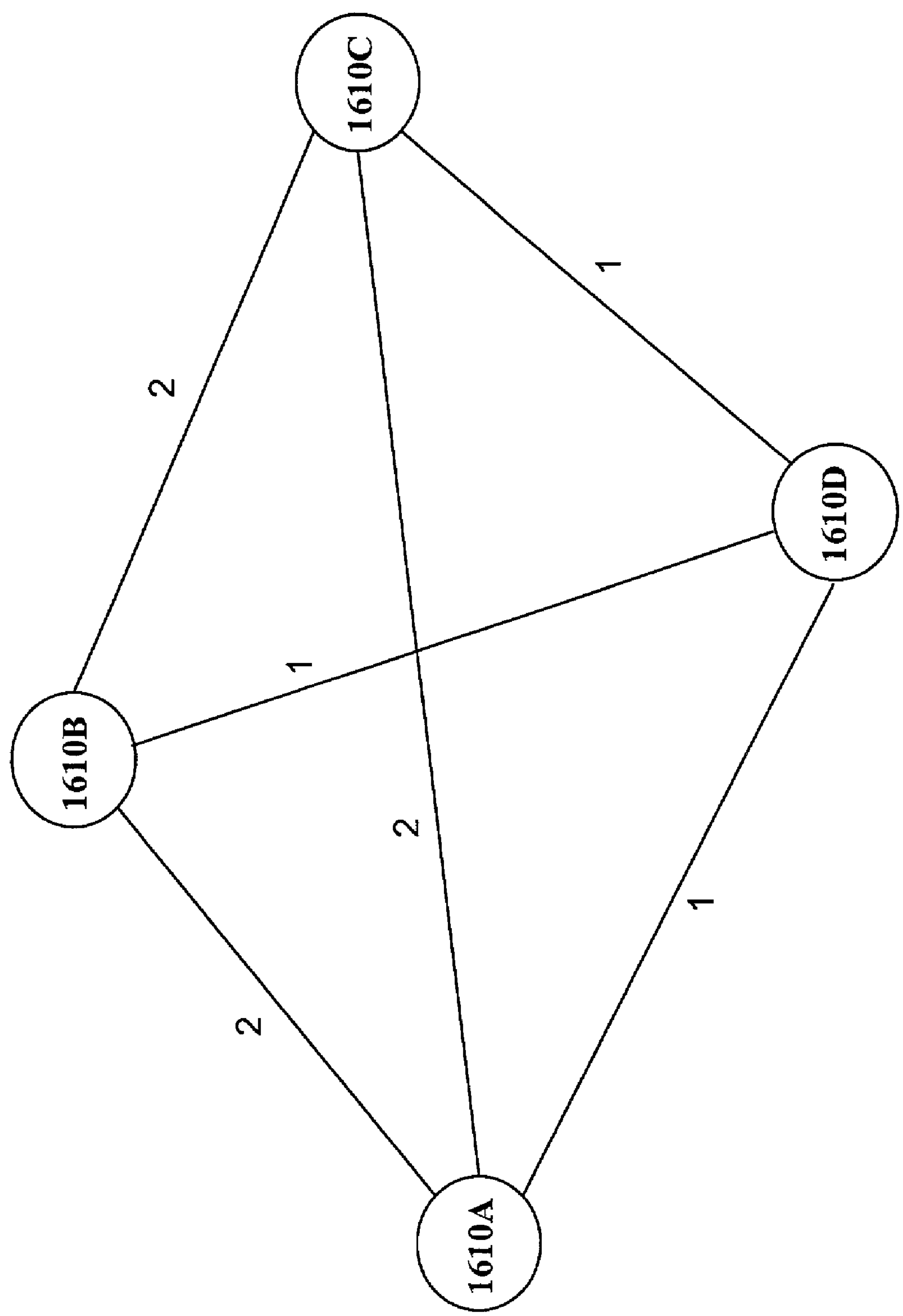
FIG. 22 illustrates the resulting configuration of the network of FIG. 18 following resource allocation.

Node X receives the request and determines that it can establish a new channel between node A and node B. It sends a message to node A and to node B informing them of the presence of the new channel. In table 1904A, Node A increases the free capacity for the edge-to-edge link A-B from 0.05 to 1.05. Node B increases the free capacity for the edge-to-edge link B-A from 0.2 to 1.2. The resulting configuration is shown in FIG. 22, which illustrates the network of FIG. 18 after resource reallocation.

Provisioning

At regular time intervals, edge nodes send constituent traffic information to the core nodes. An edge node sends constituent traffic information about a given edge-to-edge link to each core node that is part of that link. For example, edge node A sends the constituent traffic of edge-to-edge link A-X-B to core node X; the constituent traffic of edge-to-edge link A-X-Y-C to core node X and to core node Y; and the constituent traffic of edge-to-edge link A-X-Z-D to core node X and to core node Z.

Upon reception of edge-to-edge link constituent traffic information from all the edge nodes, a core node calculates the constituent traffic for edge-core physical links and core-core physical links, in a table such as tables 2302X, 2302Y and 2302Z shown in FIG. 23 for core nodes X, Y and Z, respectively. The constituent traffic on a physical link is the sum of the constituent traffic of all edge-to-edge links that pass through said physical link. For example, constituent traffic of edge-core physical link A-X is the sum of the constituent traffic on edge-to-edge links A-X-B, A-X-Y-C, and A-X-Y-Z. Each category, primary, secondary, and denied, is counted separately.

The physical links for which the ratio of primary traffic over secondary traffic is above a primary-traffic threshold, and for which the denied traffic is above a denied-traffic threshold, are considered overloaded. A core node sends the constituent traffic of each of these overloaded physical links to the network controller.

Note that is also possible for the edge node to calculate the edge-core physical link constituent traffic and to send it directly to the network controller.

Overloaded Physical Links

Figure 24:
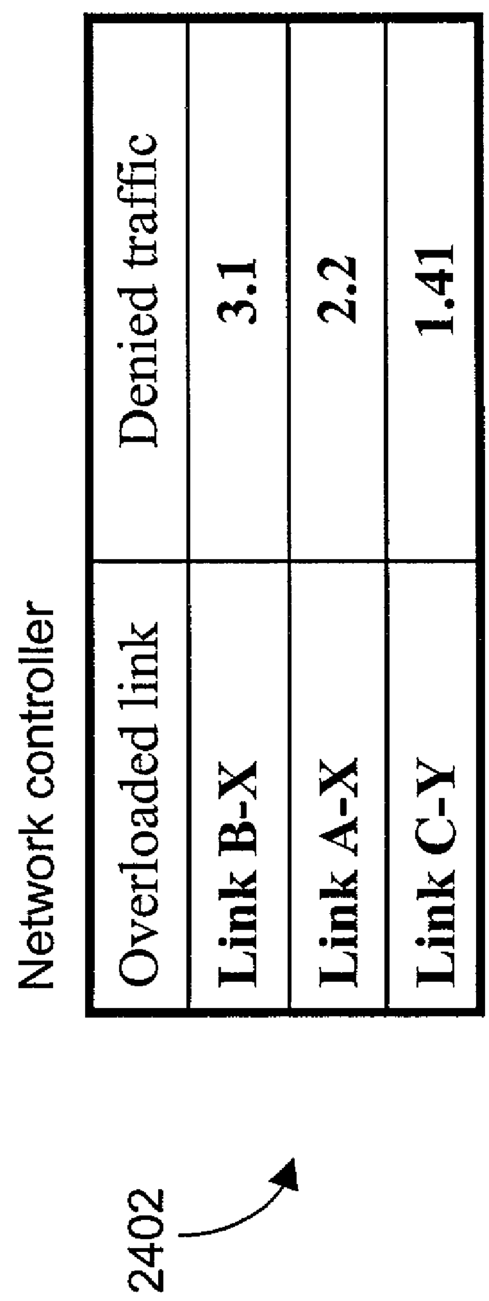
FIG.24 illustrates a list of overloaded links with associated denied traffic for the network of FIG. 16.

Upon reception of a list of overloaded physical links and their constituent traffic information from all core nodes, the network controller 270 computes a list of all overloaded physical links, sorted in decreasing order of the denied traffic quantity, such as the list in table 2402 shown in FIG. 24.

Figure 25:
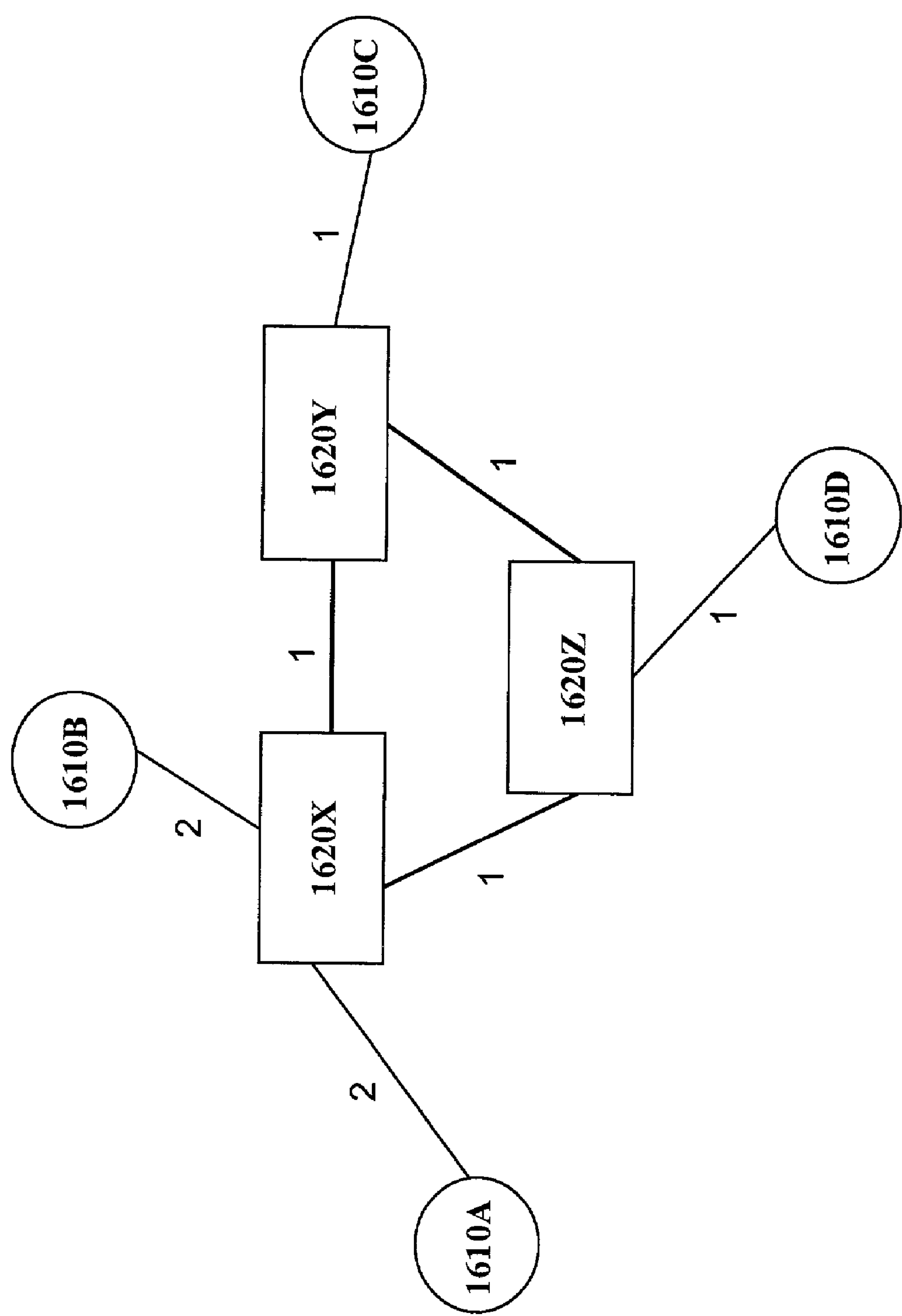
FIG. 25 illustrates a resulting network configuration if network requirements sent from a provisioning function are implemented.

It is assumed in this example that a provisioning budget of two new fibers has been provided, typically by a network operator. The network controller 270 distributes this budget proportionally to the denied traffic quantity, and prepares a recommendation to give 1 fiber to link B-X, 1 fiber to link A-X, and none to link C-Y. The network controller 270 provides the requirement and the sorted list of overloaded links for a provisioning decision, which will typically be made by the network operator. FIG. 25 illustrates the resulting network if the network requirements sent from the provisioning function are implemented. In this figure, the physical link A-X and the physical link B-X now each comprise 2 fibers.

Steps in the network provisioning method according to according to an embodiment of the present invention that may be performed at a core controller 250 include: receiving edge-to-edge link constituent traffic from at least one edge controller 260; calculating core-core and core-edge link constituent traffic; and sending a list of overloaded links to the network controller 270.

Steps in the network provisioning method according to an embodiment of the present invention that may be performed at a network controller 270 include: receiving a list of overloaded links in the network; and distributing a provisioning budget of resources among the overloaded links. The list of overloaded links in the network may be received from an edge controller 250 or from a core controller 260, or from any combination thereof.

Embodiments of any of the aspects of the present invention can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention maybe implemented as entirely hardware, or entirely software (e.g., a computer program product). For example, in a method according to an embodiment of the present invention, various steps maybe performed at each of an edge controller, core controller, or network controller. These steps may be implemented via software that resides on a computer readable memory located at each of said edge controller, core controller, or network controller.

Although various exemplary embodiments of the invention have been disclosed, it should be apparent to those skilled in the art that various changes and modifications can be made which will achieve some of the advantages of the invention without departing from the true scope of the invention.

What is claimed is:

1. A multi-stratum multi-timescale control system for self-governance of a network, said control system comprising:

routing means operating at a first stratum on a first timescale for providing route-selection functions;

resource allocation means operating at a second stratum on a second timescale for providing resource allocation functions; and provisioning means operating at a third stratum on a third timescale for providing provisioning functions;

each successive timescale being coarser than its preceding timescale;

wherein said routing means:

selects routes for connection requests received from traffic sources;

determines routing indices; and sends resource allocation requirements determined according to said routing indices to said resource allocation means;

wherein said resource allocation means:

allocates resources according to said resource allocation requirements;

determines resource allocation indices; and sends resource augmentation requirements, based on said resource allocation indices, to said provisioning means; and wherein said provisioning means produces resource installation requirements based on said resource augmentation requirements.

2. The system according to claim 1 wherein each of said routes is selected from a predefined route set and each of said routing indices is created based on automated measurements of a plurality of routes in said predefined route set.

3. The system according to claim 2 wherein said automated measurements comprise state information measurements along an entire route.

4. The system according to claim 1 wherein each of said routing indices is based on a traffic-weighted mean route depth determined as:

$$\rho=\Sigma(D_j \times Cj_j)/\Sigma C_j \text{ for } 0 \leqq j < N;$$

where

ρdenotes said each of said routing indices;

$D_j$ denotes a route depth, for a connection of capacity requirement $C_j$ bits per second, determined as a rank of a first route, in a ranked route set, having a vacancy at least equal to $C_j$; and N is a number of connection requests contending for said route set during a measurement period.

5. The system according to claim 1 wherein each of said routing indices is based on a constituent traffic indicator, said constituent traffic indicator being a proportion of traffic transferred over a preferred route in a respective route set.

6. The system according to claim 5 wherein said constituent traffic indicator is created based on automated measurements of accepted primary traffic, accepted secondary traffic, and rejected traffic, where said primary traffic is traffic transferred over a route of a predefined high rank, said secondary traffic is traffic transferred over a route of a predefined low rank, and said rejected traffic is not transferred through said network.

7. The system according to claim 6 wherein said constituent traffic indicator determines resource allocation requirements.

8. The system according to claim 1 wherein said routing means defines a routing-index threshold and determines said resource allocation requirements based only on routing indices which exceed said routing-index threshold.

9. The system according to claim 1 further comprising means for measuring efficacy of route selection in said network based on said routing indices.

10. The system according to claim 1 wherein said resource allocation indices are created based on automated measurements of resource allocation data.

11. The system according to claim 1 farther comprising means for measuring efficacy of resource allocation in said network based on said resource allocation indices.

12. The system according to claim 1 wherein said resource allocation functions comprise functions which configure the network so as to satisfy resource allocation requirements.

13. The system according to claim 1 wherein said routing means includes a plurality of edge controllers each edge controller associated with an edge node of said network, said resource allocation means includes a plurality of core controllers, each core controller associated with a core node of said network, and said provisioning means includes a network controller.

14. The system according to claim 1 wherein said resource allocation functions and said provisioning functions are integrated.

15. The system according to claim 1 wherein said second stratum and said third stratum are integrated.

16. The system according to claim 1 wherein said second timescale and said third timescale are a same timescale.

17. A multi-timescale control method for self governance of a network wherein each of successive timescales in said network is coarser than its preceding timescale, said method comprising the steps of:

a) performing, on a first timescale, a routing function, said routing function including:
   selecting preferred routes for connection requests received from traffic sources;
   determining routing indices based on said preferred routes; and
   determining resource allocation requirements based on said routing indices;
b) performing, on a second timescale, a resource allocation function, said resource allocation function including:
   allocating resources based on said resource allocation requirements;
   determining resource allocation indices; and
   determining resource augmentation requirements based on compiling said
   resource allocation indices; and
c) performing, on a third timescale, network provisioning functions based on said resource augmentation requirements for producing resource installation requirements.

18. The method according to claim 17 wherein said selecting comprises:

measuring at least one parameter relating to a plurality of routes in a route set.

19. The method according to claim 18 wherein said step of measuring at least one parameter relating to a plurality of routes in a route set comprises collecting state information measurements along an entire route.

20. The method according to claim 19 wherein said measurements are collected for a connection that is denied along said route.

21. The method according to claim 18 further comprising the step of measuring efficacy of said selecting on the basis of said routing indices.

22. The method according to claim 17 wherein said allocating comprises rearrangement of allocated transport resources to satisfy said resource allocation requirements.

23. The method according to claim 17 wherein said compiling of said resource allocation indices is based on automated measurements of resource allocation data.

24. The method according to claim 23 further comprising the step of measuring efficacy of resource allocation in said network on the basis of said resource allocation indices.

25. The method according to claim 17 wherein said second timescale and said third timescale are unified and said network provisioning functions comprise:

measuring classification and amount of traffic accepted and rejected on various links of the network; and
compiling a constituent traffic metric on the basis of said measuring.

26. The method according to claim 25 further comprising the step of providing network provisioning requirements based on said constituent traffic metric.

* * * * *